US012665628B2

(12) United States Patent
Reggiannini et al.

(10) Patent No.: US 12,665,628 B2
(45) Date of Patent: Jun. 23, 2026

(54) APPARATUS AND METHODS FOR RADIO TRANSCEIVERS

(71) Applicant: Analog Devices International Unlimited Company, Limerick (IE)

(72) Inventors: Brian Reggiannini, Norwood, MA (US); Gordon Allan, Ottawa (CA); Hatice Ozis Unsal, Raleigh, NC (US); Christopher Mayer, Dover, MA (US); Richard Schubert, Medfield, MA (US); Jianxun Fan, Cary, NC (US); Lu Wu, Summerfield, NC (US); Tolga Pamir, Ottawa (CA); Antonio Montalvo, Raleigh, NC (US); Ahmed Ali, Oak Ridge, NC (US); David McLaurin, Raleigh, NC (US)

(73) Assignee: ANALOG DEVICES INTERNATIONAL UNLIMITED COMPANY, Limerick (IE)

( * ) Notice: Subject to any disclaimer, the term of this patent is extended or adjusted under 35 U.S.C. 154(b) by 684 days.

(21) Appl. No.: 18/040,043

(22) PCT Filed: Aug. 5, 2021

(86) PCT No.: PCT/EP2021/071920
§ 371 (c)(1),
(2) Date: Jan. 31, 2023

(87) PCT Pub. No.: WO2022/029253
PCT Pub. Date: Feb. 10, 2022

(65) Prior Publication Data
US 2023/0421199 A1 Dec. 28, 2023

Related U.S. Application Data

(60) Provisional application No. 62/706,265, filed on Aug. 7, 2020.

(51) Int. Cl.
H04B 1/525 (2015.01)
H04B 1/04 (2006.01)

(52) U.S. Cl.
CPC ............... H04B 1/525 (2013.01); H04B 1/04 (2013.01)

(58) Field of Classification Search
CPC .................. H04B 1/525; H04B 1/0475; H04B 2001/0408
See application file for complete search history.

(56) References Cited

U.S. PATENT DOCUMENTS

| 4,454,384 A | * | 6/1984 | Ferrieu | ................... | H04M 9/08 |
| | | | | | 379/390.01 |
| 7,058,369 B1 | | 6/2006 | Wright et al. | | |

(Continued)

FOREIGN PATENT DOCUMENTS

| CN | 107078755 A | 8/2017 |
| CN | 108540240 A | 9/2018 |

(Continued)

OTHER PUBLICATIONS

Office Action Issued for Korean Patent Application No. 10-2023-7003102 dated Nov. 29, 2023 in 9 pages.

(Continued)

*Primary Examiner* — Dominic E Rego

(74) *Attorney, Agent, or Firm* — Knobbe, Martens, Olson & Bear, LLP

(57) ABSTRACT

Apparatus and methods for transceivers are provided herein. In a first aspect, an observation receiver is implemented to detect common-mode local oscillator (LO) leakage while the observation receiver performs other functions. In a second aspect, a transceiver is implemented with an LO leakage compensation circuit that compensates a transmitter for LO leakage using a digital filter, such as a Kalman filter, that (Continued)

combines differential LO leakage observations with common-mode LO leakage observations. In a third aspect, a transmitter includes multiple local loopback paths including a first loopback path after a variable gain amplifier (VGA) and a second loopback path before the VGA.

20 Claims, 15 Drawing Sheets

(56) References Cited

U.S. PATENT DOCUMENTS

| | | | | |
|---|---|---|---|---|
| 7,714,643 B1 * | 5/2010 | Wang | H03H 7/0153 | 327/552 |
| 9,214,915 B1 * | 12/2015 | Kingston | H03G 3/3042 | |
| 9,391,729 B2 * | 7/2016 | Liang | H04L 5/0005 | |
| 9,525,453 B2 | 12/2016 | Sarrigeorgidis et al. | | |
| 9,787,415 B2 * | 10/2017 | Fan | H04B 1/525 | |
| 2007/0123182 A1 | 5/2007 | Dekker | | |
| 2008/0233894 A1 * | 9/2008 | Aparin | H04B 1/525 | 455/78 |
| 2009/0111398 A1 | 4/2009 | Leukkunen et al. | | |
| 2009/0153482 A1 * | 6/2009 | Weinberg | G06F 3/03 | 345/163 |
| 2010/0008446 A1 * | 1/2010 | Netsell | H04L 27/368 | 375/296 |
| 2010/0048146 A1 * | 2/2010 | McCallister | H04B 1/525 | 455/78 |
| 2011/0235553 A1 | 9/2011 | Andersson et al. | | |
| 2013/0294295 A1 * | 11/2013 | Viswanathan | H04L 5/1461 | 370/278 |
| 2014/0185704 A1 * | 7/2014 | Sturkovich | H04L 1/0003 | 375/295 |
| 2014/0247757 A1 * | 9/2014 | Rimini | H04B 1/525 | 370/278 |
| 2014/0269858 A1 * | 9/2014 | Lukashevich | H04B 1/525 | 375/219 |
| 2014/0355492 A1 * | 12/2014 | Liang | H04J 3/14 | 370/278 |
| 2015/0381220 A1 * | 12/2015 | Gal | H03F 1/3241 | 375/296 |
| 2016/0056903 A1 | 2/2016 | Wang et al. | | |
| 2017/0026909 A1 * | 1/2017 | Gao | G01S 5/02525 | |
| 2018/0054225 A1 | 2/2018 | Ghannouchi et al. | | |
| 2018/0254786 A1 | 9/2018 | McLaurin et al. | | |
| 2019/0059060 A1 * | 2/2019 | Chen | H04W 52/325 | |
| 2019/0296780 A1 | 9/2019 | Nammi | | |
| 2020/0067563 A1 * | 2/2020 | Raghavan | H04B 1/662 | |
| 2020/0177288 A1 * | 6/2020 | Oswal | H04L 27/364 | |
| 2020/0205231 A1 * | 6/2020 | Trojer | H04W 24/02 | |
| 2021/0055402 A1 * | 2/2021 | Lin | H01Q 3/34 | |

FOREIGN PATENT DOCUMENTS

| | | | |
|---|---|---|---|
| EP | 1331742 | A2 | 7/2003 |
| EP | 2169837 | A1 | 3/2010 |
| EP | 2779472 | A2 | 9/2014 |
| EP | 2892193 | A1 | 7/2015 |
| EP | 3174225 | A1 | 5/2017 |
| JP | 2005-217714 | | 8/2005 |
| JP | 2006-505160 | | 2/2006 |
| JP | 2007-267345 | | 10/2007 |
| JP | 2013-110693 | | 6/2013 |
| JP | 2015-192420 | | 11/2015 |
| JP | 2015-233279 | | 12/2015 |
| JP | 2019-029706 | | 2/2019 |
| WO | WO2012126845 | A1 | 9/2012 |

OTHER PUBLICATIONS

Second Office Action with Translation for Japanese Patent Application No. 2023-508043 dated Jun. 24, 2024 in 6 pages.

Notice of Allowance with Translation for Korean Patent Application No. 10-2023-7003102 dated Jul. 26, 2024 in 9 pages.

International Search Report and Written Opinion for International Application No. PCT/EP2021/071920 dated Jan. 31, 2022 in 23 pages.

Wood, John, "System-Level Design Considerations for Digital Pre-Distortion of Wireless Base Station Transmitters," in IEEE Transactions on Microwave Theory and Techniques, vol. 65, No. 5, dated May 1, 2017 in 11 pages.

First Office Action with Translation Issued for Chinese Application No. 202180057326.6 dated Nov. 25, 2024 in 30 pages.

Notice of Allowance issued for JP Patent Application No. 2023-508043 dated Sep. 17, 2024 in 3 pages.

Office Action issued for EP Application No. 21755752.9 dated Sep. 26, 2024 in 5 pages.

Analog Devices, Inc., Data Sheet ADRV9029, Integrated, Quad RF Transceiver with Observation Path, dated Dec. 2020, in 133 pages.

Office Action issued for EP Application No. 21755752.9 dated Feb. 13, 2025 in 4 pages.

Office Action with Translation Issued for Japanese Patent Application No. 2023-508043 dated Jan. 29, 2024 in 9 pages.

Second Office Action issued in Chinese Patent Application No. 202180057326.6 dated Apr. 21, 2025 in 6 pages.

Office Action with Translation issued in Japanese Patent Application No. 2024-181947 dated Nov. 4, 2025, in 10 pages.

Office Action with Translation issued in Japanese Application No. 2024-181948 dated Dec. 2, 2025, in 5 pages.

Notice of Allowance issued for Japanese Patent Application No. 2024-181948 dated Feb. 3, 2026 in 3 pages.

Notice of Allowance issued for EP Application No. 21755752.9 dated Jun. 20, 2025 in 5 pages.

Notice of Allowance received in Chinese Patent Application No. 202180057326.6 dated Jul. 1, 2025 in 8 pages.

Notice of Allowance issued for Japanese Patent Application No. 2024-181947 dated Jan. 20, 2026 in 3 pages.

* cited by examiner

No Tx
Use Perturb
Σ@LO

LO Under Carrier
FSC Channel @LO
No Perturb
Σ@LO

Carrier Image on LO
FSC Channel @-LO
No Perturb
Σ@LO and Σ@-LO

Carrier on LO and -LO
FSC Channel @LO and @-LO
NO Perturb
$\Sigma$@LO and $\Sigma$@-LO Carrier on A
FSC Channel @A
No Perturb
$\Sigma$@LO Carrier Image on LO
Use Data Capture
Use Perturb
$\Sigma$@LO Carrier Off LO
Use Data Capture
Use Perturb
$\Sigma$@LO LO        $f_s$

570

APPARATUS AND METHODS FOR RADIO TRANSCEIVERS

FIELD OF THE DISCLOSURE

Embodiments of the invention relate to electronic systems, and more particularly to, transceivers for radio frequency (RF) communication systems.

DESCRIPTION OF THE RELATED TECHNOLOGY

Radio transceivers can be used in a wide variety of radio frequency (RF) communication systems. For example, transceivers can be included in base stations or mobile devices to transmit and receive signals associated with a wide variety of communications standards, including, for example, cellular and/or wireless local area network (WLAN) standards. Transceivers can also be used in radar systems, instrumentation, industrial electronics, military electronics, laptop computers, digital radios, and/or other electronics.

SUMMARY OF THE DISCLOSURE

In one aspect, a transceiver integrated circuit (IC) is provided. The transceiver IC includes a first transmitter including at least one mixer and a local oscillator (LO), wherein the first transmitter is configured to generate a first radio frequency (RF) transmit signal based on the LO controlling the at least one mixer to provide frequency upconversion. The transceiver IC further includes an observation receiver configured to receive an observation signal for observing at least the first transmitter, wherein the observation receiver includes an observation data path configured to process the observation signal to detect a transmit power of the first RF transmit signal, and an LO leakage observation circuit configured to generate leakage observation data based on processing data captured from the observation data path. The first transmitter is configured to process the leakage observation data to compensate for a leakage of the LO.

In some embodiments, the LO leakage observation circuit does not interrupt the observation data path from detecting the transmit power.

In various embodiment, the observation data path is further configured to process the observation signal to perform digital pre-distortion (DPD), wherein the LO leakage observation circuit does not interrupt the observation data path from performing DPD.

In certain embodiments, the first transmitter is further configured to compensate for the leakage of the LO based on local transmit observation data from one or more local observation paths of the transceiver IC. According to a number of embodiments, the first transmitter is configured to detect a differential LO leakage from the local leakage observation data, and a common-mode LO leakage from the leakage observation data from the observation receiver. In accordance with several embodiments, the first transmitter further includes a variable gain amplifier (VGA) configured to amplify the first RF transmit signal, wherein the one or more local observation paths includes a first local observation path after the VGA and a second local observation path before the VGA. According to various embodiments, the first transmitter comprises a digital filter configured to process both the local leakage observation data and the leakage observation data from the observation receiver. In accordance with a number of embodiments, the digital filter is a Kalman filter. According to several embodiments, the first transmitter is configured to collect the local leakage observation data and the leakage observation data from the observation receiver in a plurality of batches. In accordance with various embodiments, the first transmitter is configured to update a value of an LO leakage compensation signal for compensating for the leakage of the LO after receiving a given number of samples of the local leakage observation data and the leakage observation data from the observation receiver.

In some embodiments, the LO leakage observation circuit includes a digital mixer configured to generate frequency-shifted data based on mixing the data captured from the observation data path, and a digital accumulator configured to generate the leakage observation data based on accumulating the frequency-shifted data. According to several embodiments, the LO leakage observation circuit further includes a digital oscillator configured to provide a digital clock signal to the digital mixer. In accordance with a number of embodiments, the digital oscillator is a numerically controlled oscillator (NCO).

In various embodiments, the transceiver IC further includes a plurality of transmitters including the first transmitter, wherein the observation signal is configured to observe one of the plurality of transmitters at a given time. According to several embodiments, the LO leakage observation circuit is configured to separately track the leakage observation data for each of the plurality of transmitters. In accordance with a number of embodiments, a selected transmitter for observation of the plurality of transmitters is changeable without interrupting operation of the LO leakage observation circuit.

In certain embodiments, the observation data path includes an analog-to-digital converter (ADC) configured to generate a digital observation signal based on the observation signal, and a digital circuit configured to process the digital observation signal.

In another aspect, a method of compensating for local oscillator (LO) leakage in a transceiver is provided. The method includes generating a first radio frequency (RF) transmit signal using a first transmitter that includes at least one mixer and a local oscillator (LO) that controls the at least one mixer, generating an observation signal based on a loopback path from the first transmitter to an observation receiver through an RF front end, processing the observation signal to detect a transmit power of the first RF transmit signal using an observation data path of the observation receiver, generating leakage observation data based on processing data captured from the observation data path, and processing the leakage observation data to compensate for a leakage of the LO.

In various embodiments, the leakage observation data is generated without interrupting detection of the transmit power.

In several embodiments, processing the observation signal includes performing digital pre-distortion (DPD) on the first RF transmit signal, wherein the leakage observation data is generated without interrupting DPD.

In certain embodiments, the method further includes compensating for the leakage of the LO based on local transmit observation data from one or more local observation paths that are not through the RF front end. According to a number of embodiments, the method further includes detecting a differential LO leakage from the local leakage observation data, and detecting a common-mode LO leakage from the leakage observation data from the observation receiver. In accordance with several embodiments, the method further includes amplifying the first RF transmit signal using a variable gain amplifier (VGA) of the first transmitter, and generating the local leakage observation data using a first local observation path after the VGA and a second local observation path before the VGA. According to various embodiments, the method further includes merging the local leakage observation data and the leakage observation data from the observation receiver using a digital filter. In accordance with a number of embodiments, the digital filter is a Kalman filter. According to several embodiments, the method further includes collecting the local leakage observation data and the leakage observation data from the observation receiver in a plurality of batches. In accordance with various embodiments, the method further includes updating a value of an LO leakage compensation signal for compensating for the leakage of the LO after receiving a given number of samples of the local leakage observation data and the leakage observation data from the observation receiver.

In some embodiments, generating the leakage observation data includes mixing the data captured from the observation data path using a digital mixer, and accumulating the mixed data to generate the leakage observation data. According to various embodiments, generating the leakage observation data further includes controlling the digital mixer using a digital oscillator. In accordance with a number of embodiments, the digital oscillator is a numerically controlled oscillator (NCO).

In several embodiments, the method further includes generating a plurality of RF transmit signals using a plurality of transmitters, and observing one of the plurality of transmitters at a given time using the observation receiver. According to various embodiments, the method further includes separately tracking the leakage observation data for each of the plurality of transmitters. In accordance with a number of embodiments, generating the observation signal includes amplifying the plurality of RF transmit signals using a plurality of power amplifiers, sensing a plurality of output powers of the plurality of power amplifiers using a plurality of directional couplers, and multiplexing the plurality of directional couplers to obtain the observation signal.

In various embodiments, processing the observation signal includes generating a digital observation signal from the observation signal using an analog-to-digital converter (ADC), and processing the digital observation signal using a digital circuit.

In certain embodiments, generating the observation signal includes amplifying the first RF transmit signal using a power amplifier, and sensing an output power of the power amplifier using a directional coupler.

In another aspect, a radio frequency (RF) communication system is provided. The RF communication system includes an RF front end, and a transceiver comprising a first transmitter configured to provide a first RF transmit signal to the RF front end, and an observation receiver configured to receive an observation signal by way of a loopback path from the first transmitter to the observation receiver through the RF front end. The observation receiver includes an observation data path for processing the observation signal to detect a transmit power of the first RF transmit signal, and a local oscillator (LO) leakage observation circuit configured to generate leakage observation data based on processing data captured from the observation data path. The first transmitter processes the leakage observation data to compensate an LO of the first transmitter for leakage.

In some embodiments, the LO leakage observation circuit does not interrupt the observation data path from detecting the transmit power.

In various embodiments, the observation data path processes the observation signal to perform digital pre-distortion (DPD), wherein the LO leakage observation circuit does not interrupt the observation data path from performing DPD.

In certain embodiments, the first transmitter is further configured to compensate for the leakage of the LO based on local transmit observation data from one or more local observation paths of the transceiver. According to several embodiments, the first transmitter is configured to detect a differential LO leakage from the local leakage observation data, and a common-mode LO leakage from the leakage observation data from the observation receiver. In accordance with a number of embodiments, the first transmitter further includes a variable gain amplifier (VGA) configured to amplify the first RF transmit signal, wherein the one or more local observation paths includes a first local observation path after the VGA and a second local observation path before the VGA. According to various embodiments, the first transmitter comprises a digital filter configured to process both the local leakage observation data and the leakage observation data from the observation receiver. In accordance with several embodiments, the digital filter is a Kalman filter. According to a number of embodiments, the first transmitter is configured to collect the local leakage observation data and the leakage observation data from the observation receiver in a plurality of batches. In accordance with various embodiments, the first transmitter is configured to update a value of an LO leakage compensation signal for compensating for the leakage of the LO after receiving a given number of samples of the local leakage observation data and the leakage observation data from the observation receiver.

In some embodiments, the LO leakage observation circuit includes a digital mixer configured to generate frequency-shifted data based on mixing the data captured from the observation data path, and a digital accumulator configured to generate the leakage observation data based on accumulating the frequency-shifted data. In a number of embodiments, the LO leakage observation circuit further includes a digital oscillator configured to provide a digital clock signal to the digital mixer. According to several embodiments, the digital oscillator is a numerically controlled oscillator (NCO).

In various embodiments, the transceiver comprises a plurality of transmitters including the first transmitter, wherein the observation signal is configured to observe one of the plurality of transmitters at a given time. According to a number of embodiments, the LO leakage observation circuit is configured to separately track the leakage observation data for each of the plurality of transmitters. In accordance with several embodiments, a selected transmitter for observation of the plurality of transmitters is changeable without interrupting operation of the LO leakage observation circuit. According to some embodiments, the RF front end includes a plurality of power amplifiers configured to amplify the plurality of RF transmit signals, a plurality of directional couplers configured to sense a plurality of output powers of the plurality of power amplifiers, and a multiplexer coupled to the plurality of directional couplers and configured to output the observation signal.

In certain embodiments, the observation data path includes an analog-to-digital converter (ADC) configured to generate a digital observation signal based on the observation signal, and a digital circuit configured to process the digital observation signal.

In several embodiments, the RF front end includes a power amplifier configured to amplify the first RF transmit signal and a directional coupler configured to generate the observation signal based on sensing an output power of the power amplifier.

In another aspect, a transceiver includes a transmitter configured to generate a radio frequency (RF) transmit signal, wherein the transmitter is configured to generate first observation data based on observing the RF transmit signal on one or more local observation paths within the transmitter. The transceiver further includes an observation receiver configured to generate second observation data based on processing an observation signal. The transceiver further includes a local oscillator (LO) leakage compensation circuit configured to compensate the transmitter for a leakage of an LO of the transmitter, wherein the LO leakage compensation circuit includes a digital filter configured to process the first observation data and the second observation data.

In several embodiments, the digital filter is a Kalman filter. According to various embodiments, the Kalman filter is configured to estimate a correction value for the leakage of the LO using a plurality of non-linear equations. In accordance with some embodiments, the Kalman filter is further configured to revise the correction value based on a linear update of the Kalman filter using an observation matrix. According to a number of embodiments, the observation matrix corresponds to a Jacobian matrix. In accordance with various embodiments, a first portion of the plurality of non-linear equations are a function of the first observation data, and wherein a second portion of the plurality of non-linear equations are a function of the second observation data. According to some embodiments, the LO leakage compensation circuit includes a processor, and the Kalman filter is implemented as software running on the processor.

In certain embodiments, the transmitter includes digital transmitter circuitry configured to process a digital in-phase (I) signal and a digital quadrature-phase (Q) signal, wherein the digital filter is configured to compensate the transmitter for the leakage of the LO based at least on part on controlling the digital transmitter circuitry. According to some embodiments, the digital filter is configured to control a first DC offset of the digital I signal and a second DC offset of the digital Q signal. In accordance with various embodiments, the digital transmitter circuitry includes a programmable finite impulse response (PFIR) filter, wherein the digital filter is configured to control the PFIR. According to several embodiments, the transmitter includes an I-path digital-to-analog converter (DAC) coupled to the digital transmitter circuitry and configured to generate an analog I signal, a controllable I-path filter configured to generate a filtered I signal based on filtering the analog I signal, a Q-path DAC coupled to the digital transmitter circuitry and configured to generate an analog Q signal, and a controllable Q-path filter configured to generate a filtered Q signal based on filtering the analog Q signal. In accordance with some embodiments, the digital filter controls settings of the controllable I-path filter and the controllable Q-path filter. According to a number of embodiments, the transceiver further includes an I-path mixer configured to receive the filtered I signal and controlled by the LO, and a Q-path mixer configured to receive the filtered Q signal and controlled by the LO, wherein the RF transmit signal is generated based on combining an output of the I-path mixer and an output of the Q-path mixer.

In some embodiments, the first observation data indicates a differential LO leakage of the LO and the second observation data indicates a common-mode LO leakage of the LO.

In several embodiments, the transmitter includes a variable gain amplifier (VGA) configured to amplify the first RF transmit signal, wherein the one or more local observation paths includes a first local observation path after the VGA and a second local observation path before the VGA.

In another aspect, a method of local oscillator (LO) leakage compensation in a transceiver is provided. The method includes generating a radio frequency (RF) transmit signal using a transmitter, generating first observation data based on observing the RF transmit signal on one or more local observation paths within the transmitter, generating second observation data using an external loopback path from the transmitter to an observation receiver through a front end system, and compensating the transmitter for a leakage of an LO of the transmitter based on processing the first observation data and the second observation data using a digital filter.

In certain embodiments, the digital filter is a Kalman filter. According to various embodiments, the method further includes estimating a correction value for the leakage of the LO using a plurality of non-linear equations. In accordance with several embodiments, the method further includes revising the correction value based on a linear update of the Kalman filter using an observation matrix. According to a number of embodiments, the observation matrix corresponds to a Jacobian matrix. In accordance with various embodiments, a first portion of the plurality of non-linear equations are a function of the first observation data, and a second portion of the plurality of non-linear equations are a function of the second observation data.

In some embodiments, the method further includes processing a digital in-phase (I) signal and a digital quadrature-phase (Q) signal using digital transmitter circuitry of the transmitter, and compensating the transmitter for the leakage of the LO based at least on part on controlling the digital transmitter circuitry using the digital filter. According to a number of embodiments, controlling the digital transmitter circuitry includes adjusting a first DC offset of the digital I signal and adjusting a second DC offset of the digital Q signal. In accordance with several embodiments, the digital transmitter circuitry includes a programmable finite impulse response (PFIR) filter, wherein controlling the digital transmitter circuitry includes adjusting the PFIR.

In various embodiments, the first observation data indicates a differential LO leakage of the LO and the second observation data indicates a common-mode LO leakage of the LO.

In some embodiments, the method further includes amplifying the RF transmit signal using a variable gain amplifier (VGA), wherein the one or more local observation paths includes a first local observation path after the VGA and a second local observation path before the VGA.

In another aspect, a radio frequency (RF) communication system is provided. The RF communication system includes an RF front end and a transceiver. The transceiver includes a transmitter configured to provide an RF transmit signal to the RF front end, wherein the transmitter is configured to generate first observation data based on observing the RF transmit signal on one or more local observation paths within the transmitter. The transceiver further includes an observation receiver configured to generate second observation data based on processing an observation signal receive from an external loopback path from the transmitter to the observation receiver through the RF front end. The transceiver further includes a local oscillator (LO) leakage compensation circuit configured to compensate the transmitter for a leakage of an LO of the transmitter. The LO leakage compensation circuit includes a digital filter configured to process the first observation data and the second observation data.

In some embodiments, the digital filter is a Kalman filter. According to several embodiments, the Kalman filter is configured to estimate a correction value for the leakage of the LO using a plurality of non-linear equations. In accordance with various embodiments, the Kalman filter is configured to revise the correction value based on a linear update of the Kalman filter using an observation matrix. According to a number of embodiments, the observation matrix corresponds to a Jacobian matrix. In accordance with several embodiments, a first portion of the plurality of non-linear equations are a function of the first observation data, and a second portion of the plurality of non-linear equations are a function of the second observation data. According to various embodiments, the LO leakage compensation circuit comprises a processor, and the Kalman filter is implemented as software running on the processor.

In certain embodiments, the transmitter comprises digital transmitter circuitry configured to process a digital in-phase (I) signal and a digital quadrature-phase (Q) signal, and the digital filter is configured to compensate the transmitter for the leakage of the LO based at least on part on controlling the digital transmitter circuitry. According to several embodiments, the digital filter is configured to control a first DC offset of the digital I signal and a second DC offset of the digital Q signal. In accordance with various embodiments, the digital transmitter circuitry includes a programmable finite impulse response (PFIR) filter, wherein the digital filter is configured to control the PFIR. According to a number of embodiments, the transmitter includes an I-path digital-to-analog converter (DAC) coupled to the digital transmitter circuitry and configured to generate an analog I signal, a controllable I-path filter configured to generate a filtered I signal based on filtering the analog I signal, a Q-path DAC coupled to the digital transmitter circuitry and configure to generate an analog Q signal, and a controllable Q-path filter configured to generate a filtered Q signal based on filtering the analog Q signal. In accordance with several embodiments, the digital filter controls settings of the controllable I-path filter and the controllable Q-path filter. According to various embodiments, the RF communication system further includes an I-path mixer configured to receive the filtered I signal and controlled by the LO, and a Q-path mixer configured to receive the filtered Q signal and controlled by the LO, wherein the RF transmit signal is generated based on combining an output of the I-path mixer and an output of the Q-path mixer.

In several embodiments, the first observation data indicates a differential LO leakage of the LO and the second observation data indicates a common-mode LO leakage of the LO.

In some embodiments, the transmitter includes a variable gain amplifier (VGA) configured to amplify the first RF transmit signal, wherein the one or more local observation paths includes a first local observation path after the VGA and a second local observation path before the VGA.

In various embodiments, the RF front end includes a power amplifier configured to amplify the RF transmit signal, and a directional coupler configured to generate the observation signal based on sensing an output power of the power amplifier.

In another aspect, a transceiver integrated circuit (IC) includes a plurality of mixers including a first mixer configured to upconvert an analog in-phase (I) signal, and a second mixer configured to upconvert an analog quadrature-phase (Q) signal, wherein an output of the first mixer and an output of the second mixer are configured to combine to generate a radio frequency (RF) transmit signal. The transceiver further includes a variable gain amplifier (VGA) configured to amplify the RF transmit signal to generate an amplified RF transmit signal, and a plurality of local loopback circuits including a first local loopback circuit coupled to an output of the VGA and a second local loopback circuit coupled to an input of the VGA.

In various embodiment, the transceiver IC further includes at least one subsampling analog-to-digital converter (ADC) configured to process at least one output of the plurality of local loopback circuits. According to a number of embodiments, the at least one subsampling ADC includes a shared subsampling ADC configured to digitize an output of a selected local loopback circuit chosen from the first local loopback circuit or the second local loopback circuit. In accordance with some embodiments, the first mixer and the second mixer are implemented as harmonic rejection mixers. According to several embodiments, the first mixer and the second mixer are configured to reject at least a third order harmonic and a fifth order harmonic.

In certain embodiments, at least one of the first local loopback circuit or the second local loopback circuit includes an RF harmonic rejection filter. According to some embodiments, the RF harmonic rejection filter is configured to reject at least a seventh order harmonic. In accordance with several embodiments, the transceiver IC further includes digital transmitter circuitry configured to process a plurality of digital transmit samples captured by the at least one subsampling ADC. According to a number of embodiments, the digital transmitter circuitry is configured to predict an impact of aliasing of the at least one subsampling ADC. In accordance with some embodiments, the digital transmitter circuitry includes a frequency selection circuit configured to generate a plurality of frequency shifted digital transmit samples based on shifting a frequency of the plurality of digital transmit samples. According to a number of embodiments, the digital transmitter circuitry further includes an accumulator circuit configured to separately accumulate the plurality of frequency shifted digital transmit samples, and the plurality of digital transmit samples without frequency shifting. In accordance with several embodiments, the transceiver IC further includes a local oscillator configured to control the first mixer and the second mixer, wherein the frequency shifting circuit is configured to shift the plurality of digital transmit samples based on a frequency difference between the local oscillator and a sampling rate of the at least one subsampling ADC. According to a number of embodiments, the transceiver IC further includes an observation receiver configured to provide the digital transmitter circuitry with a plurality of digital observation samples, wherein the accumulation circuit is further configured to accumulate the plurality of digital observation samples after frequency shifting by the frequency shifting circuit. In accordance with various embodiments, the transceiver IC further includes a local oscillator configured to control the first mixer and the second mixer, wherein the frequency shifting circuit is configured to shift the plurality of digital observation samples based on a frequency of the local oscillator. According to several embodiments, the at least one subsampling ADC is configured to sample the output of the plurality of loopback circuits at a sampling rate less than a carrier frequency of the RF transmit signal.

In various embodiments, the transceiver IC further includes digital transmitter circuitry configured to generate a digital I signal and a digital Q signal, a first DAC configured to generate the analog I signal based on the digital I signal, and a second DAC configured to generate the analog Q signal based on the digital Q signal. According to a number of embodiments, the transceiver IC further includes a local oscillator configured to control the first mixer and the second mixer, wherein the digital transmitter circuitry is configured to provide compensation for a leakage of the local oscillator based on a plurality of digital transmit samples captured by at least one of the plurality of local loopback circuits. In accordance with several embodiments, the transceiver IC further includes an observation receiver configured to generate a plurality of digital observation samples, wherein the digital transmitter circuitry is further configured to compensate for the leakage of the local oscillator based on the plurality of digital observation samples. According to some embodiments, the digital transmitter circuitry is configured to provide quadrature error correction (QEC) based on the plurality of digital transmit samples.

In accordance with various embodiments, the first local loopback circuit includes a controllable attenuator.

In some embodiments, at least one of the first local loopback circuit or the second local loopback circuit includes a controllable gain circuit.

In another aspect, a method of loopback in a transceiver is provided. The method includes generating a radio frequency (RF) signal based on upconverting an analog in-phase (I) signal using a first mixer, upconverting an analog quadrature-phase (Q) signal a second mixer, and combining an output of the first mixer and an output of the second mixer. The method further includes amplifying the RF transmit signal to generate an amplified RF transmit signal using a variable gain amplifier (VGA), and providing loopback using a plurality of local loopback paths including a first local loopback circuit coupled to an output of the VGA and a second local loopback circuit coupled to an input of the VGA.

In some embodiments, the method further includes processing at least one output of the plurality of local loopback circuits using at least one subsampling analog-to-digital converter (ADC). According to various embodiments, the method further includes digitizing an output of a selected local loopback circuit chosen from the first local loopback circuit or the second local loopback using a shared subsampling ADC. In accordance with a number of embodiments, the first mixer and the second mixer are implemented as harmonic rejection mixers. According to several embodiments, the first mixer and the second mixer are configured to reject at least a third order harmonic and a fifth order harmonic.

In certain embodiments, at least one of the first local loopback circuit or the second local loopback circuit comprises an RF harmonic rejection filter. According to a number of embodiments, the RF harmonic rejection filter is configured to reject at least a seventh order harmonic. In accordance with several embodiments, the method further includes processing a plurality of digital transmit samples captured by the at least one subsampling ADC using digital transmitter circuitry. According to a number of embodiments, the method further includes predicting an impact of aliasing of the at least one subsampling ADC using the digital transmitter circuitry. In accordance with various embodiments, the method further includes generating a plurality of frequency shifted digital transmit samples based on shifting a frequency of the plurality of digital transmit samples. According to a number of embodiments, the method further includes separately accumulating the plurality of frequency shifted digital transmit samples and the plurality of digital transmit samples without frequency shifting. In accordance with several embodiments, the method further includes controlling the first mixer and the second mixer using a local oscillator, wherein the plurality of frequency shifted digital transmit samples are generated based on a frequency difference between the local oscillator and a sampling rate of the at least one subsampling ADC. In accordance with a number of embodiments, the method further includes frequency shifting a plurality of digital observation samples from an observation receiver, and accumulating the plurality of digital observation samples after frequency shifting. According to several embodiments, the method further includes controlling the first mixer and the second mixer using a local oscillator, wherein the plurality of digital observation samples are frequency shifted based on a frequency of the local oscillator. In accordance with a number of embodiments, the method further includes operating the at least one subsampling ADC at a sampling rate less than a carrier frequency of the RF transmit signal.

In certain embodiments, the method further includes controlling the first mixer and the second mixer using a local oscillator, and compensating for a leakage of the local oscillator based on a plurality of digital transmit samples captured by at least one of the plurality of local loopback circuits. According to a number of embodiments, the method further includes compensating for the leakage of the local oscillator based on a plurality of digital observation samples from an observation receiver.

In several embodiments, the method further includes correcting for a quadrature error between the analog I signal and the analog Q signal based on a plurality of digital transmit samples captured by at least one of the plurality of local loopback circuits.

In another aspect, a radio frequency (RF) communication system is provided. The RF communication system includes an RF front end configured to receive an amplified RF transmit signal, and a transceiver. The transceiver includes a plurality of mixers including a first mixer configured to upconvert an analog in-phase (I) signal, and a second mixer configured to upconvert an analog quadrature-phase (Q) signal, wherein an output of the first mixer and an output of the second mixer are configured to combine to generate an RF transmit signal. The transceiver further includes a variable gain amplifier (VGA) configured to amplify the RF transmit signal to generate the amplified RF transmit signal. The transceiver further includes a plurality of local loopback circuits including a first local loopback circuit coupled to an output of the VGA and a second local loopback circuit coupled to an input of the VGA.

In various embodiments, the transceiver further includes at least one subsampling analog-to-digital converter (ADC) configured to process at least one output of the plurality of local loopback circuits.

DETAILED DESCRIPTION

Figure 1:
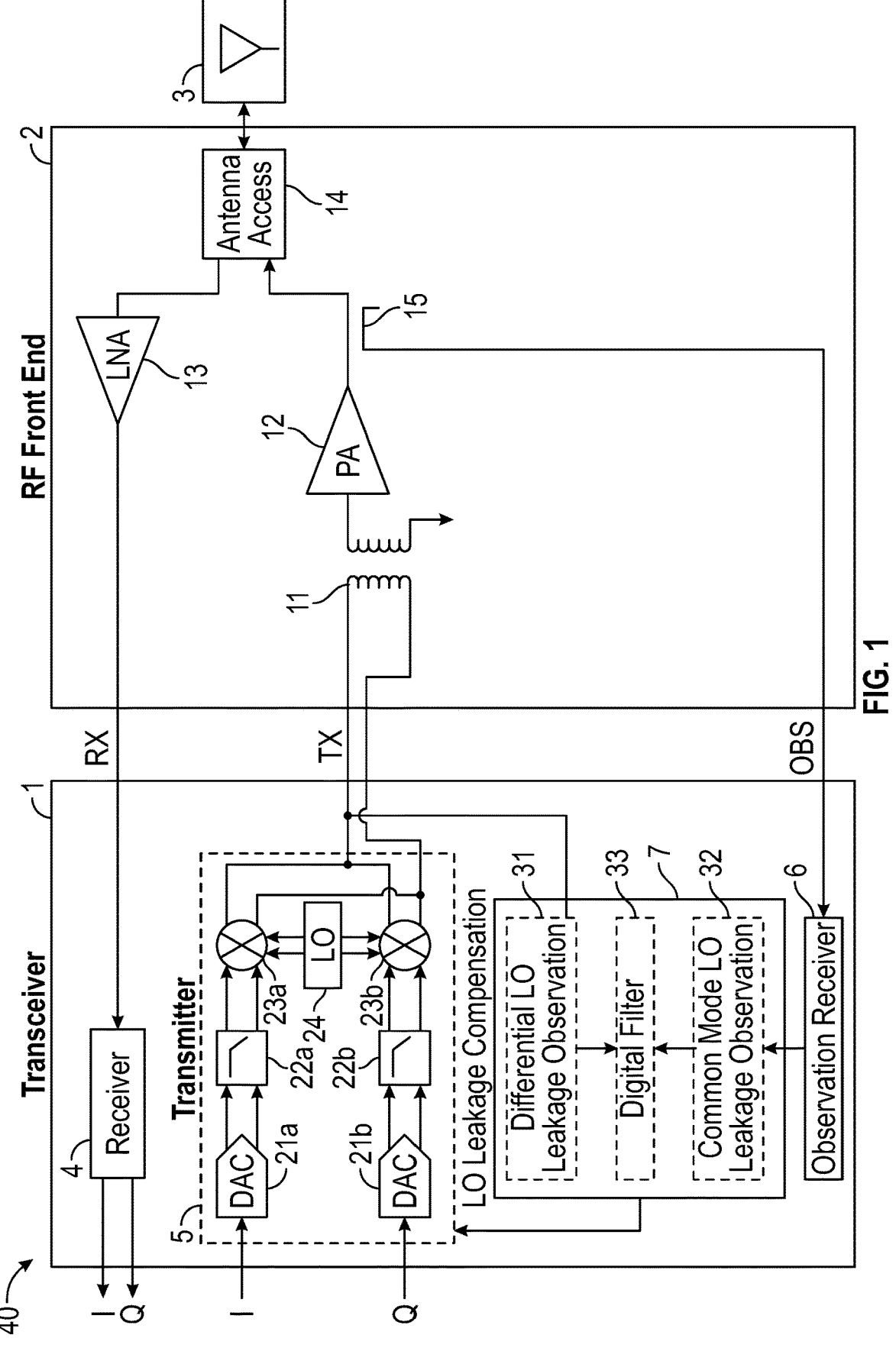
FIG. 1 is a schematic diagram of a radio frequency (RF) communication system according to one embodiment.

The following detailed description of embodiments presents various descriptions of specific embodiments of the invention. However, the invention can be embodied in a multitude of different ways. In this description, reference is made to the drawings where like reference numerals may indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

Transceivers are used in radio frequency (RF) communication systems to transmit and receive signals associated with a wide variety of communication technologies, such as cellular and/or wireless local area network (WLAN) technologies.

Examples of RF communication systems with one or more transceivers include, but are not limited to, base stations, mobile devices (for instance, smartphones or handsets), laptop computers, tablets, and wearable electronics.

A transceiver includes a transmitter for transmitting RF signals and a receiver for receiving RF signals. To improve the transceiver's performance, the transceiver can be calibrated to compensate for impairments. Calibrating the transceiver in this manner can decrease error vector magnitude (EVM), reduce out of band emissions, and/or otherwise enhance the performance of the transceiver.

Absent calibration, impairments of a transceiver can lead to performance degradation.

In one example, a direct conversion quadrature radio includes a zero-intermediate frequency (zero-IF) transmitter used for transmitting RF signals. The zero-IF transmitter upconverts a baseband signal using a local oscillator (LO) frequency that is at or near a carrier frequency. Although zero-IF transmitters can have significant power and costs advantages relative to IF and super heterodyne transmitters, zero-IF transmitters suffer from impairments that limit in-band undesired emission performance.

One such transmitter impairment is LO leakage, in which a portion of an LO signal used for mixing appears at the transmitter's output. LO leakage can arise from finite isolation between an LO port of a mixer and a signal port of the mixer. Absent correction or calibration, the LO leakage can lead to failure of tests monitoring for undesired transmit emissions.

For example, undesired DC offsets in the transmitter's baseband can mix with the LO signal, thereby generating LO power at the transmitter's output. The LO leakage can be present at frequencies having specified limits on undesired emissions from the transmitter. Thus, LO leakage can limit transmitter performance in applications having relatively stringent emissions specifications. For example, certain zero-IF transmitters support non-contiguous carrier aggregation, in which the LO frequency may not be inside a desired frequency channel. In such implementations, the emissions limits can be relatively strict.

To reduce or limit such undesired emissions, the transmitter can be calibrated to reduce the level of LO leakage.

A transmitter can include a non-inverted voltage output $V_{tx\_p}$ and an inverted voltage output $V_{tx\_n}$ for providing a transmitter output signal. Additionally, the transmitter output signal has a differential component about equal to $(V_{tx\_p}-V_{tx\_n})$ and a common-mode component about equal to $(V_{tx\_p}+V_{tx\_n})/2$. Differential LO leakage can impact the differential component of the transmitter output signal, and common-mode LO leakage can impact the common-mode component of the transmitter output signal.

Although differential LO leakage can be observed locally to the transceiver, a common-mode LO leakage component may not be locally observable. Differential LO leakage is also referred to herein as internal LO leakage, and common-mode LO leakage is also referred to herein as external LO leakage.

Common-mode LO leakage can also degrade the performance of a transmitter, such as a zero-IF transmitter. For example, a balun can be included to convert a differential output signal of a transmitter to a single-ended signal suitable for amplification by a power amplifier (PA) and subsequent transmission via an antenna. Ideally the balun rejects a common-mode component of LO leakage present in the transmitter's differential output signal. However, finite common-mode rejection ratio (CMRR) of the balun can result in a portion of the common-mode LO leakage nevertheless reaching the balun's output.

In contrast, the CMRR of a typical observation receiver used for observing and calibrating a transmitter is relatively high, such that the observation receiver does not observe common-mode LO leakage. Even in implementations in which the observation receiver's CMRR is finite, the CMRR of the observation receiver and the CMRR of the balun may not match. Thus, such observation receivers are unsuitable for estimating the amount of common-mode LO leakage and for compensating the same.

Apparatus and methods for transceivers are provided herein.

In a first aspect, an observation receiver is implemented to detect common-mode LO leakage. Such detection can occur while the observation receiver performs other functions, such as observing portions of the RF transmit spectrum for purposes of power control and/or digital pre-distortion (DPD). Accordingly, the observation receiver is implemented to observe common-mode LO leakage as a background process (for instance, as a batch collection) without needing to interrupt power control and/or DPD.

In a second aspect, a transceiver is implemented with an LO leakage compensation circuit that compensates a transmitter for LO leakage based on combining differential LO leakage observations (which can be locally observed in the transceiver) with common-mode LO leakage observations (which can be observed by way of an off-chip path from the transmitter to an observation receiver through an RF front end system). Thus, the LO leakage compensation circuit can operate based on observations from a local (on-chip) loopback path and an external (off-chip) loopback path. The LO leakage compensation circuit can include a digital filter, for example, a Kalman filter, that processes both differential and common-mode LO leakage observations to generate a combined LO correction signal for compensating the transmitter.

In a third aspect, a transmitter includes a pair of mixers for generating an RF transmit signal based on upconverting analog I and Q signals, an LO for providing clock signals to the pair of mixers, a variable gain amplifier (VGA) for amplifying the RF transmit signal to generate an amplified RF transmit signal, and multiple local loopback paths including a first loopback path after the VGA and a second loopback path before the VGA. The first loopback path and the second loopback path can be used for compensating for LO leakage as well as other functions, such as quadrature error correction (QEC). In certain implementations, the observations from the local loopback paths are digitized by at least one subsampling ADC, and the mixers are implemented as harmonic rejection mixers and/or the loopback paths include RF filters for filtering out higher order harmonics. Thus, the transceiver is implemented to reduce harmonics (for instance, third, fifth, and/or seventh order harmonics) that can otherwise cause issues to arise due to aliasing in the subsampling ADC.

Example of an RF Communication System Including a Transceiver

FIG. 1 is a schematic diagram of a radio frequency (RF) communication system 40 according to one embodiment. The RF communication system 40 includes a transceiver 1, an RF front end system 2, and an antenna 3.

Although one embodiment of an RF communication system 40 is depicted, the teachings herein are applicable to RF communication systems implemented in a wide variety of ways. Accordingly, other implementations are possible.

In the illustrated embodiment, the transceiver 1 includes a receiver 4, a transmitter 5, an observation receiver 6, and a local oscillator (LO) leakage compensation circuit 7. Although an example with one transmit channel, one receive channel, and one observation channel is depicted, the teachings herein are applicable to transceivers with other numbers of transmit channels, receive channels, and/or observation channels. Moreover, the number of transmit channels, receive channels, and observation channels need not be equal.

The transceiver 1 receives in-phase (I) and quadrature-phase (Q) transmit data from a baseband processor (not shown in FIG. 1), and provides I and Q receive data to the baseband processor.

As shown in FIG. 1, the transmitter 5 includes an I-path digital-to-analog converter (DAC) 21a, an I-path filter 22a, an I-path mixer 23a, a Q-path DAC 21b, a Q-path filter 22b, a Q-path mixer 23b, and an LO 24.

The I-path DAC 21a serves to process the I transmit data to generate an analog I signal, which is filtered by the I-path filter 22a to generate a filtered I signal. The filtered I signal is upconverted by the I-path mixer 23a to radio frequency. In particular, the I-path mixer 23a mixes the filtered I signal and a first LO clock signal from the LO 24 to generate an upconverted I signal.

Likewise the Q-path DAC 21b serves to process the Q transmit data to generate an analog Q signal, which is filtered by the Q-path filter 22b to generate a filtered Q signal. Additionally, the Q-path mixer 23b mixes the filtered Q signal and a second LO clock signal from the LO 24 to generate an upconverted Q signal.

The LO 24 can be implemented in a wide variety of ways, including, but not limited to, using a frequency synthesizer, such as a fractional N phase-locked loop (PLL). The first LO clock signal and the second LO clock signal can have a phase difference suitable for upconverting the filtered I signal and the filtered Q signal. For example, a quadrature or 90 degree phase difference can be used.

The upconverted I signal and the upconverted Q signal are combined to generate a transmit signal TX, which is differential. The transmit signal TX is provided to the RF front end system 2.

In the illustrated embodiment, the RF front end system 2 includes a balun 11, a power amplifier (PA) 12, a low noise amplifier (LNA) 13, an antenna access circuit 14, and a directional coupler 15. Although one example of front end circuitry is depicted, other implementations are possible. For example, the RF front end system 2 can include additional structures, such as filters, amplifiers, attenuators, duplexers, diplexers, switches, and/or control circuitry. Furthermore, the components can be arranged in other ways, including, but not limited to, using separate antennas for transmit and receive.

The balun 11 receives the differential transmit signal TX, which is converted by the balun 11 to a single-ended transmit signal for amplification by the PA 12. The PA 12 outputs an amplified RF transmit signal, which is provided to the antenna 3 by way of the antenna access circuit 14. The antenna access circuit 14 can include switches, duplexers, diplexers, and/or other structures suitable for controlling access of transmit and receive paths to the antenna 3.

As shown in FIG. 1, the directional coupler 15 is included between the output of the PA 12 and the antenna access circuit 14, and serves to sense the amplified RF transmit signal to generate an observation signal OBS. As shown in FIG. 1, the observation signal OBS is provided to the observation receiver 6 of the transceiver 1.

The LNA 13 receives an RF receive signal from the antenna 3 by was of the antenna access circuit 14. The LNA 13 amplifies the RF receive signal to generate an amplified receive signal RX, which can be single-ended or differential.

The receiver 4 processes the amplified receive signal RX to generate the I and Q receive data.

As shown in FIG. 1, the transceiver 1 includes the LO leakage compensation circuit 7, which compensates the transmitter 5 for LO leakage based on observations of both differential LO leakage and common-mode leakage.

For example, in the illustrated embodiment, the LO leakage compensation circuit 7 includes the differential LO leakage observation circuit 31 for observing an amount of differential LO leakage present in the differential transmit signal TX. Since the transceiver 1 is typically formed on a semiconductor die separate from the semiconductor die(s) used to form the RF front end system 2, the observation of differential LO leakage can be based on a local observation path of the transceiver 1.

With continuing reference to FIG. 1, the LO leakage compensation circuit 7 further includes the common-mode LO leakage observation circuit 32, which observes common-mode LO leakage based on data flowing through the observation receiver 6. In certain implementations, the observation receiver 6 is implemented to allow observations of common-mode LO leakage without interrupting other operations of the observation receiver 6, such as observing portions of the frequency spectrum of the amplified RF transmit signal for purposes of transmit power control and/or DPD.

In the illustrated embodiment, the LO leakage compensation circuit 7 further includes the digital filter 33, which combines the observations from the differential LO leakage observation circuit 31 and the common-mode LO leakage observation circuit 32 to generate the LO leakage compensation signal for the transmitter 5. In certain implementations, the digital filter 33 includes a Kalman filter.

The LO leakage compensation circuit 7 can compensate the transmitter 5 for LO leakage in a wide variety of ways. In one example, digital compensation can be used. For instance, digital adders can be used for adding an appropriate DC offset to the I and Q paths. In a second example, analog compensation can be used. For instance, a controllable oscillator signal (with controllable differential and/or common-mode components) can be combined with the differential transmit signal TX to provide compensation for LO leakage. Moreover, a combination of digital and analog techniques can be used.

Example Observation Receivers for Observing Common-Mode LO Leakage

Figure 2A:
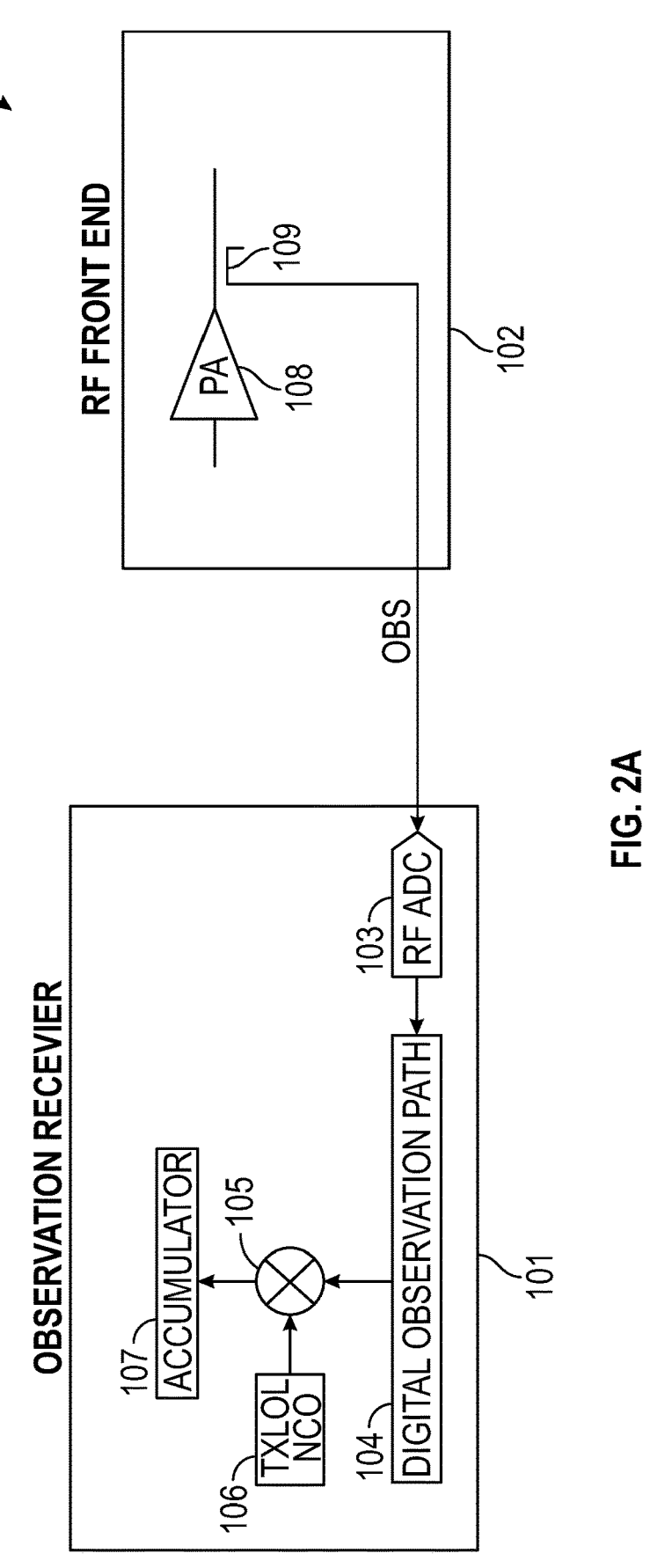
FIG. 2A is a schematic diagram of a portion of an RF communication system according to another embodiment.

FIG. 2A is a schematic diagram of a portion of an RF communication system 110 according to another embodiment. The RF communication system 110 includes an observation receiver 101 and an RF front end system 102. The observation receiver 101 is part of a transceiver (not shown in FIG. 2A).

The RF front end system 102 includes a power amplifier 108 and a directional coupler 109. The power amplifier 108 outputs and amplified RF transmit signal, which is sensed by the directional coupler 109 to generate the RF observation signal OBS. For clarity of the figure, only the power amplifier 108 and the directional coupler 109 of the RF front end system 102 are depicted. However, the RF front end system 102 can include other components.

In the illustrated embodiment, the observation receiver 101 includes an RF analog-to-digital converter (RF ADC) 103 for generating a digital observation signal based on the RF observation signal OBS from the RF front end system 102. Although an example with an RF ADC 103 is shown, other implementations are possible, such as configurations using a cascade of an observation mixer and an ADC.

With continuing reference to FIG. 2A, the observation receiver 101 further includes a digital observation path 104 including various digital circuits for processing the digital observation signal. The digital observation path 104 is also referred to herein as digital observation circuitry. The digital observation path 104 can be used to perform observations for purposes of transmit power control, DPD, and/or other functions.

As shown in FIG. 2A, a digital mixer 105, a digital oscillator 106, and a digital accumulator 107 are also included for observing common-mode LO leakage. The digital mixer 105 taps off a portion (or portions) of the digital observation path 104, and thus observes the digital data stream of the observation receiver 101 without needing to interrupt operations of the observation receiver 101, such as transmit power control and/or DPD.

The digital mixer 105 is used to frequency shift the tapped observation data based on a digital oscillation signal from the digital oscillator 106. Thus, the frequency content for common-mode LO leakage observations can be offset in frequency relative to the data flowing through the digital observation path 104. The digital accumulator 107 accumulates the observation data, which can be further processed by an LO leakage compensation circuit (now shown in FIG. 2A). In certain implementations, the digital oscillator 106 corresponds to a numerically controlled oscillator (NCO).

Figure 2B:
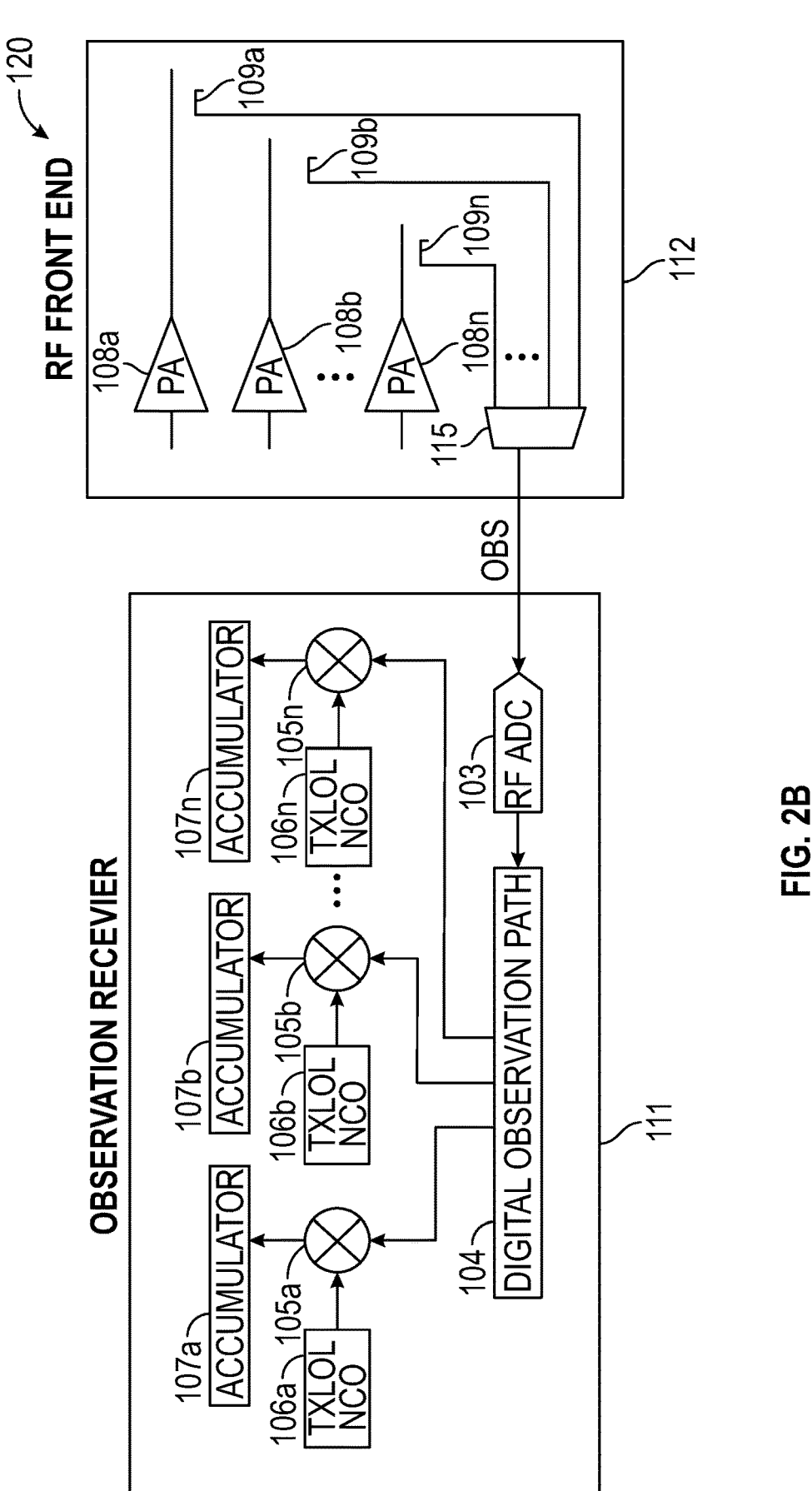
FIG. 2B is a schematic diagram of a portion of an RF communication system according to another embodiment.

FIG. 2B is a schematic diagram of a portion of an RF communication system 120 according to another embodiment. The RF communication system 120 includes an observation receiver 111 and an RF front end system 112. The observation receiver 111 is part of a transceiver (not shown in FIG. 2B).

The RF front end system 112 includes power amplifiers 108a, 108b, . . . 108n, directional couplers 109a, 109b, . . . 109n, and a multiplexer 115. Any number of power amplifiers and directional couplers can be included, as indicated by the ellipsis. Additionally, the power amplifiers 108a, 108b, . . . 108n can transmit at the same or different frequencies. The multiplexer 115 is used to select a particular sensed signal from the directional couplers 109a, 109b, . . . 109n to provide as the RF observation signal OBS.

By multiplexing the directional couplers 108a, 108b, . . . 108n, a common observation receiver can be used to observe multiple transmit paths through the RF front end system 120. However, other implementations are possible.

In the illustrated embodiment, the observation receiver 111 includes an RF ADC 103 and a digital observation path 104, as was described above with respect to FIG. 2A. The observation receiver 111 further includes digital mixers 105a, 105b, . . . 105n, digital oscillators 106a, 106b, . . . 106n (any or all of which can be NCOs), and digital accumulators 107a, 107b, . . . 107n.

The digital mixers 105a, 105b, . . . 105n tap off data from the digital observation path 104, and thus observe the digital data stream of the observation receiver 111 without needing to interrupt operations of the observation receiver 111, such as transmit power control and/or DPD.

Furthermore, multiple instantiations of mixers, oscillators, and accumulators are provided for separately tracking common-mode LO leakage associate with multiple transmit paths. For example, each of the PAs 108a, 108b, . . . 108n can amplify an RF transmit signal generated using a different LO, and thus the common-mode LO leakage can vary from transmit channel to transmit channel.

Accordingly, based on which directional coupler 109a, 109b, . . . 109n is selected by the multiplexer 115, a corresponding accumulator 107*a*, 107*b*, . . . 107*n* of the observation receiver 111 can be activated.

By accumulating frequency-shifted samples indicating common-mode LO leakage in the background, a user can change the observed path in the RF front end system 112 and/or do any other desired operations without needing to stop for purposes of common-mode LO leakage observations. Thus, the common-mode LO leakage compensation process can be transparent to a user.

Figure 3:
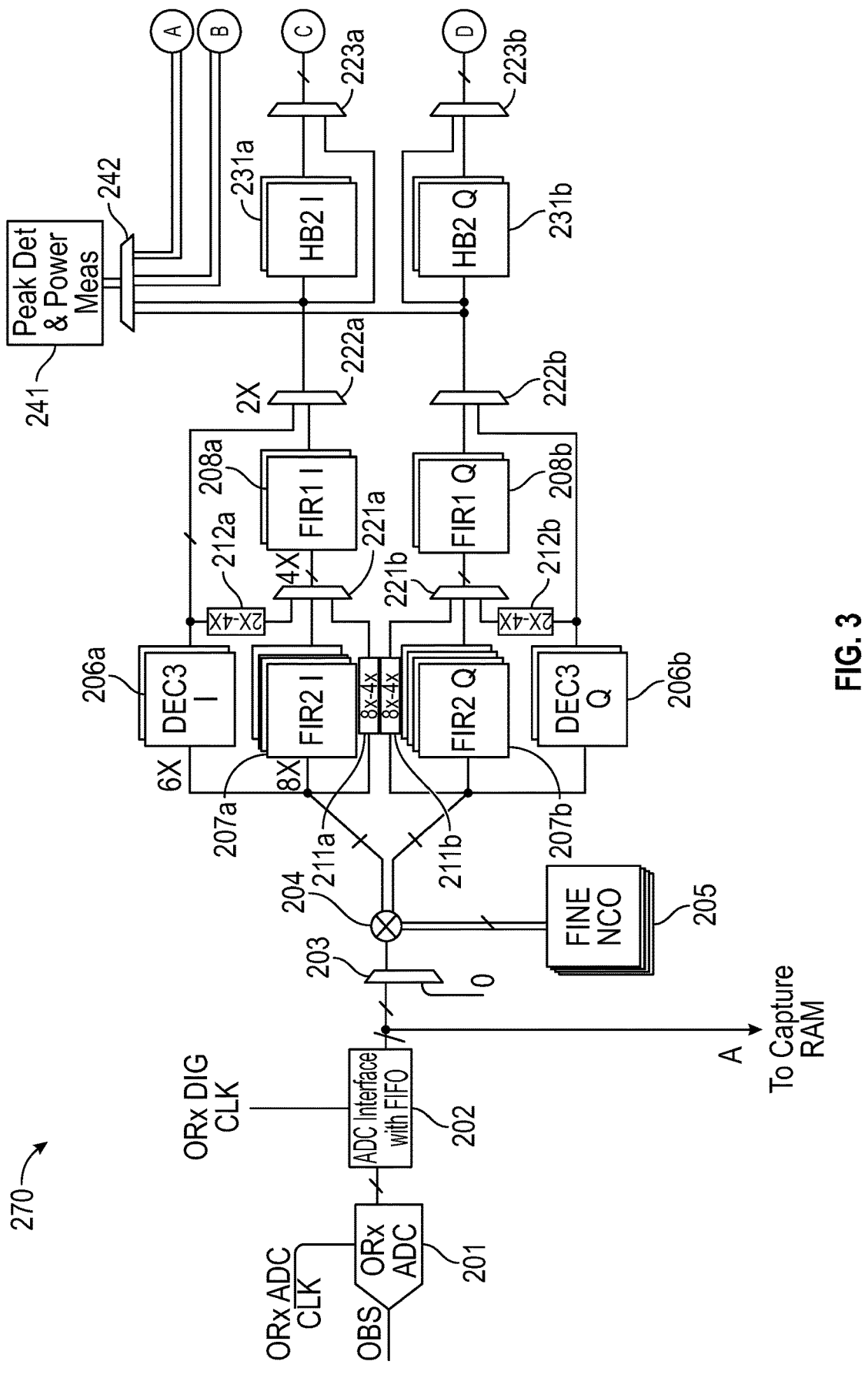
FIG. 3 is a schematic diagram of an observation receiver according to another embodiment.
Figure 3:
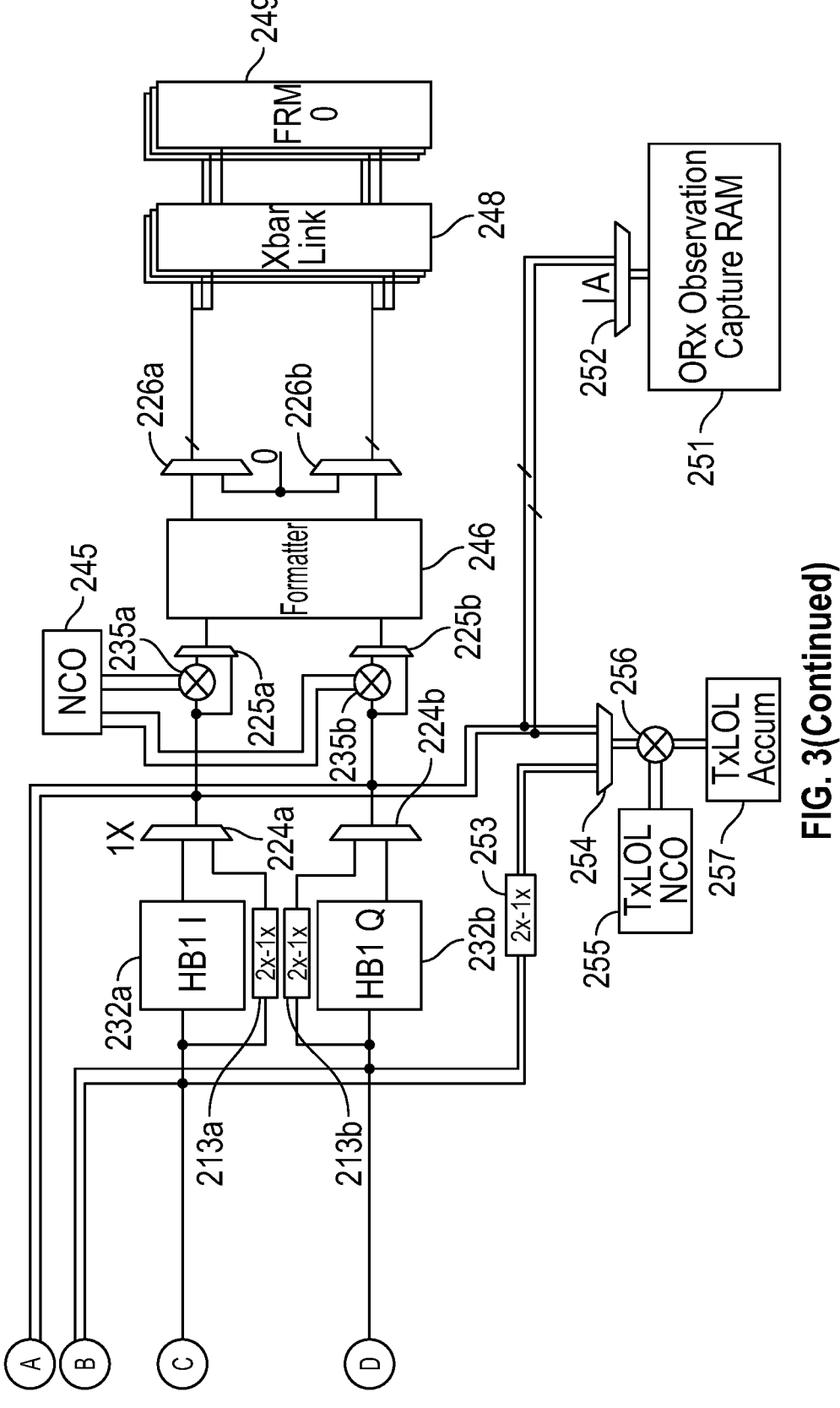

FIG. 3 is a schematic diagram of an observation receiver 270 according to another embodiment. The observation receiver 270 includes an RF ADC 201, an ADC interface with first-in first-out (FIFO) 202, an input multiplexer 203, a digital downconverting mixer 204, a fine NCO 205, an I-path decimator 206*a*, a first I-path finite impulse response (FIR) filter 207*a*, a second I-path FIR filter 208*a*, a first I-path interpolator 211*a*, a second I-path interpolator 212*a*, a third I-path interpolator 213*a*, a first I-path multiplexer 221*a*, a second I-path multiplexer 222*a*, a third I-path multiplexer 223*a*, a fourth I-path multiplexer 224*a*, a fifth I-path multiplexer 225*a*, a sixth I-path multiplexer 226*a*, a first I-path halfband (HB) filter 231*a*, a second I-path HB filter 232*a*, an I-path mixer 235*a*, a Q-path decimator 206*b*, a first Q-path FIR filter 207*b*, a second Q-path FIR filter 208*b*, a first Q-path interpolator 211*b*, a second Q-path interpolator 212*b*, a third Q-path interpolator 213*b*, a first Q-path multiplexer 221*b*, a second Q-path multiplexer 222*b*, a third Q-path multiplexer 223*b*, a fourth Q-path multiplexer 224*b*, a fifth Q-path multiplexer 225*b*, a sixth Q-path multiplexer 226*b*, a first Q-path HB filter 231*b*, a second Q-path HB filter 232*b*, a Q-path mixer 235*b*, a peak detection and power measurement circuit 241, a detection multiplexer 242, an NCO 245, a formatter 246, a crossbar link 248, a framer 249, an observation capture random access memory (RAM) 251, an observation capture multiplexer 252, a leakage observation multiplexer 254, a leakage observation NCO 255, a leakage observation mixer 256, and a leakage observation accumulator 257.

Although one embodiment of an observation receiver is depicted, the teachings herein are applicable to observation receivers implemented in other ways.

Figure 4:
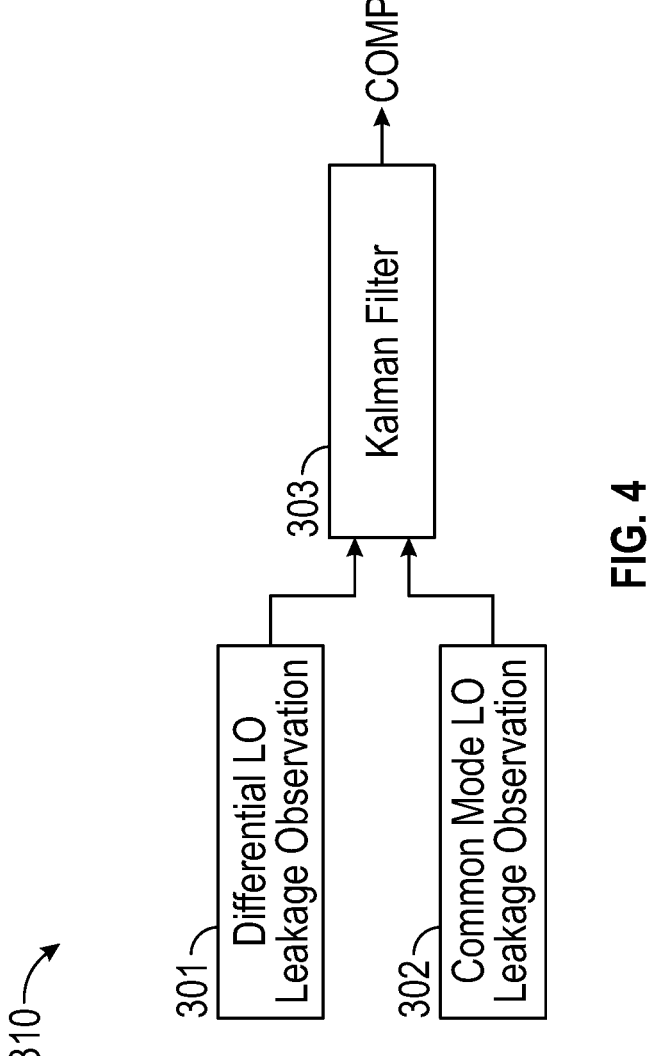
FIG. 4 is a schematic diagram of a local oscillator (LO) leakage compensation circuit according to another embodiment.

Example Kalman Filters for Processing Local and External LO Leakage Observations FIG. 4 is a schematic diagram of an LO leakage compensation circuit 310 according to another embodiment. The LO leakage compensation circuit 310 includes a differential LO leakage observation circuit 301, a common-mode LO leakage observation circuit 302, and a Kalman filter 303.

In the illustrated embodiment, the Kalman filter 303 processes both differential and common-mode LO leakage observations to generate a combined LO correction signal for compensating a transmitter of a transceiver.

FIGS. 5A-5G depict various transmitter LO leakage cases that can occur during operation of a transceiver. Although FIGS. 5A-5G depict sampling frequency $f_s$, for all diagrams $f_s$ could be replaced with multiples of $f_s/2$, where $f_s$ is the sampling rate of the ADC. Furthermore, data collection can be performed around a single alias point, if desired.

Figure 5A:
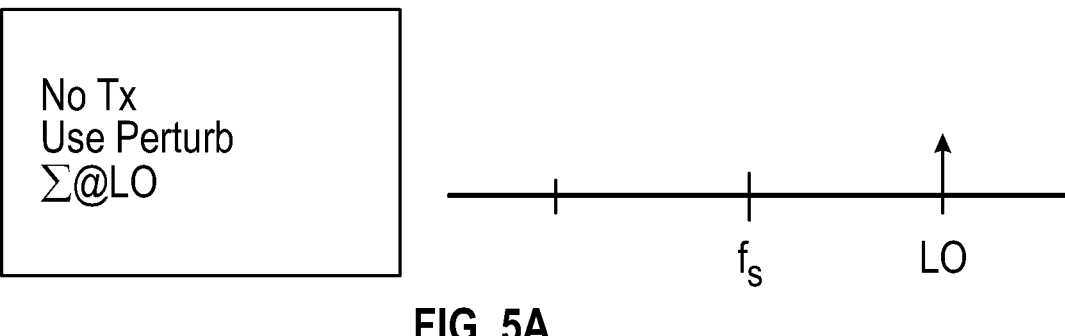
FIG. 5A is a schematic diagram of a first example of LO leakage.

FIG. 5A is a schematic diagram of a first example of LO leakage. In this example, no transmit signal is present, but internal transmitter LO leakage is present.

In certain implementations, a perturbation is introduced (for instance, to discover the channel for purposes of making a correction) in this scenario, since no signal is present. Furthermore, when running transmitter LO leakage correction loops (for instance, in the LO leakage compensation circuit 7 of FIG. 1), at the end of each pass an adjustment is made to the transmitter DC (for instance, a digital adjustment to the I and Q transmit signals inputted to the transmitter) to attempt to correct the LOL. This adjustment can be used with pre-adjustment and post-adjustment measurements as a perturbation.

When starting at an initial correction point, the channel information can be inherited from a previously run calibration or other valid channel. If such information is unavailable, an initial guess can be used when the transmitter LO leakage correction loops iteratively adjusting and learning from the result. For example, in the absence of channel information, the digital filter (for instance, Kalman filter) of the LO leakage compensation circuit can be initialized to a generic guess for a range with a high uncertainty. At the end of the first data collection pass, the Kalman filter can estimate the correction.

In certain implementations, the correction is limited to a reasonable amount, for instance, 128 least significant bits (LSBs). Although the estimated correction can be wrong, on the next pass the estimated correction can serve as a perturbation to aid in settling to a real correction value. For example, this scenario can correspond to an algorithm edge case, and occurs infrequently in practice since typically either a transmit signal is present or inherited channel information is available.

With continuing reference to FIG. 5A, in certain implementations the correction is implemented using Equation 1 below, where LB' corresponds to a frequency shifted loopback samples as discussed further below.

$$\text{Correction} = \frac{LB'}{\text{channel}} - TX \qquad \text{Equation 1}$$

Figure 5B:
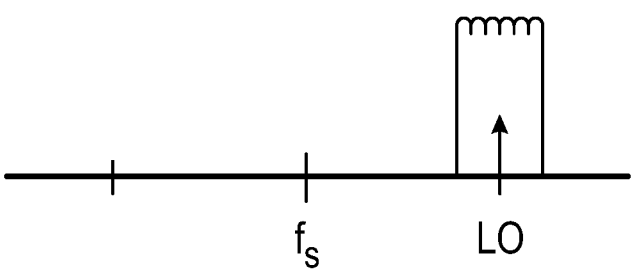
FIG. 5B is a schematic diagram of a second example of LO leakage.

FIG. 5B is a schematic diagram of a second example of LO leakage. The second case corresponds to a scenario in which the LO leakage is under the carrier frequency.

In such a scenario, a very accurate channel measurement is desired, since we will be observing large intentional TX signal on LO, and this needs to be measured at the LPBCK and removed from the correction. To input refer the loopback measurement (observation receiver) to the transit signal, the measurement can be divided by the channel, and thus an accurate channel is desired for a precise cancellation. In the digital transmitter electronics, an accumulator can provide such information.

Figure 5C:
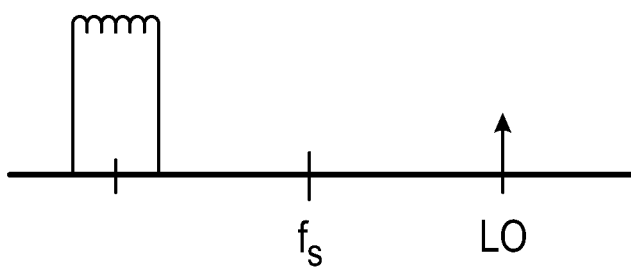
FIG. 5C is a schematic diagram of a third example of LO leakage.

FIG. 5C is a schematic diagram of a third example of LO leakage. In this scenario, the carrier image is on the LO frequency. In the third scenario, the loopback ADC runs at a frequency $f_s$, so the transmit spectrum at $2f_0$-LO shows up in the loopback spectrum at the same location as the LO frequency.

Figure 5D:
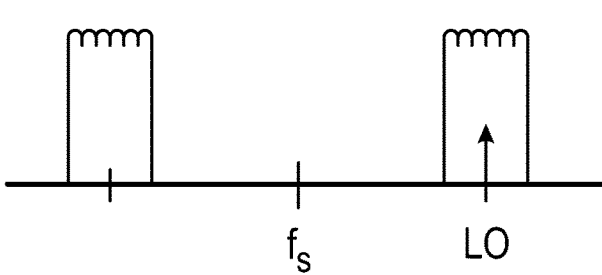
FIG. 5D is a schematic diagram of a fourth example of LO leakage.

FIG. 5D is a schematic diagram of a fourth example of LO leakage. In the fourth example, the carrier is on the LO frequency and the carrier image is on the −LO frequency.

With reference to FIGS. 5B-5D, measurements of the TX at LO and −LO can be made, as well as a measurement of the observation receiver at the LO frequency. Thus, a Kalman filter operating on three variables can be used, g0 (gain at LO frequency), g1 (gain at −LO frequency), and u (correction).

For the second case depicted in FIG. 5B, g0 can be computed by cross correlation. For the third case depicted in FIG. 5C, both g0 and g1 can be computed by cross correlation. In the third case, the Kalman filter learns g1 separately from g0. Thus, in this case, g1 will be learned with large signal, and g0 will be learned via corrections.

When no signal is present, then the Kalman filter will know the previous correction made and the corresponding effect on the current measurement. Thus, the Kalman filter can automatically use corrections as perturbations to generate channel information.

Figure 5E:
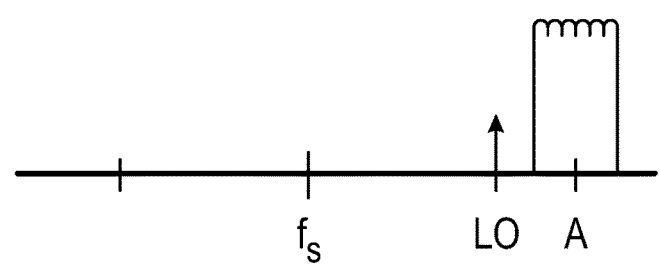
FIG. 5E is a schematic diagram of a fifth example of LO leakage.

FIG. 5E is a schematic diagram of a fifth example of LO leakage. In this example, internal transmitter LO leakage is present, and carrier is off both the LO and –LO frequencies.

Figure 5F:
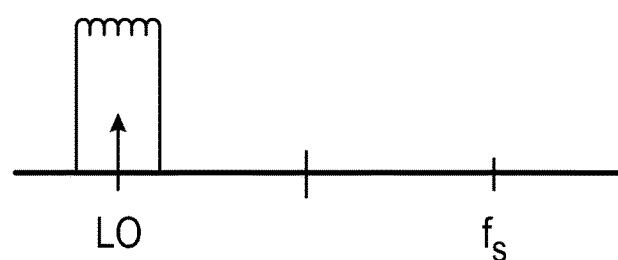
FIG. 5F is a schematic diagram of a sixth example of LO leakage.

FIG. 5F is a schematic diagram of a sixth example of LO leakage. In this example, external transmitter LO leakage is present, and the carrier is on the LO frequency.

Figure 5G:
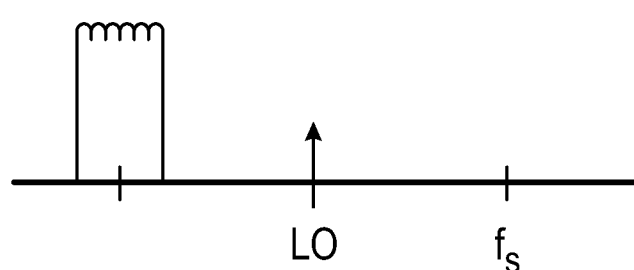
FIG. 5G is a schematic diagram of a seventh example of LO leakage.

FIG. 5G is a schematic diagram of a seventh example of LO leakage. In this example, external transmitter LO leakage is present, and the carrier is off the LO frequency.

Although seven examples of LO leakage are depicted, other LO leakage scenarios are possible. For instance in another example, external LO leakage is present while no transmit signal present.

Figure 6A:
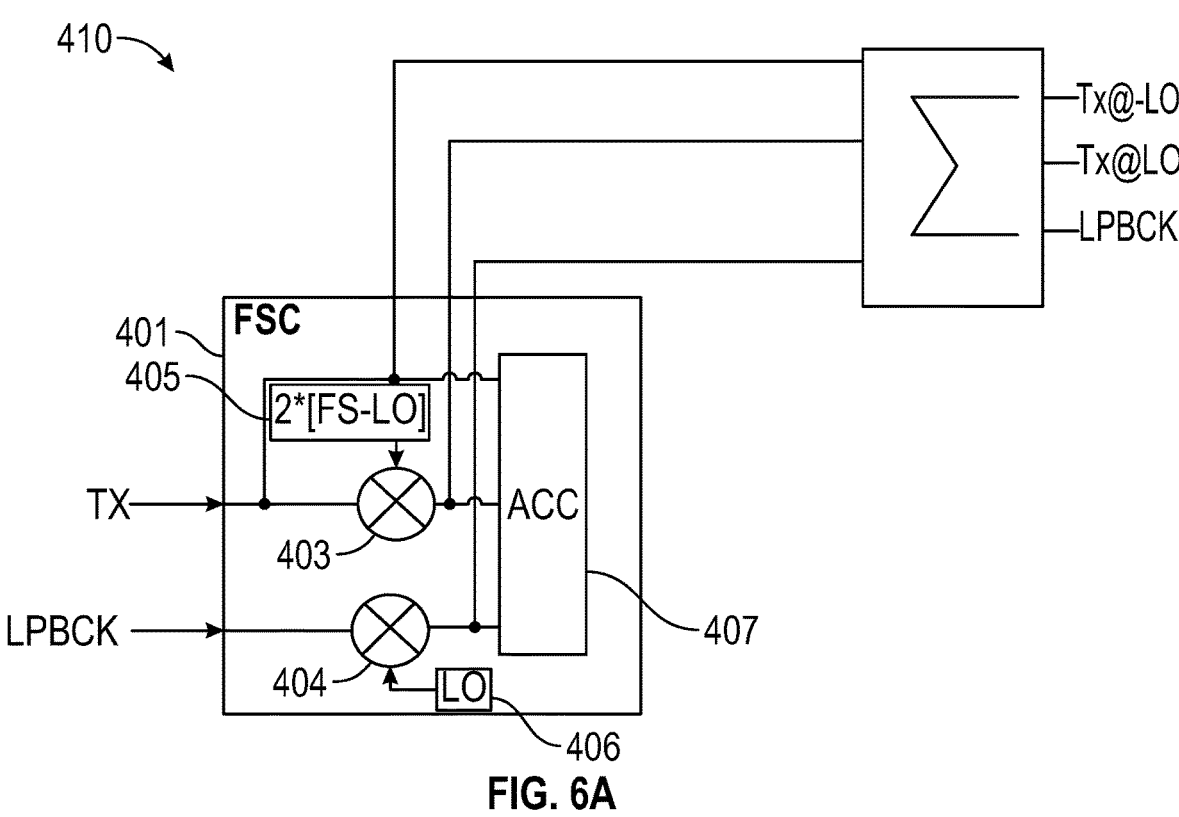
FIG. 6A is a schematic diagram of one embodiment of digital transmitter circuitry for processing transmit signal samples and observation receiver samples.
Figure 6B:
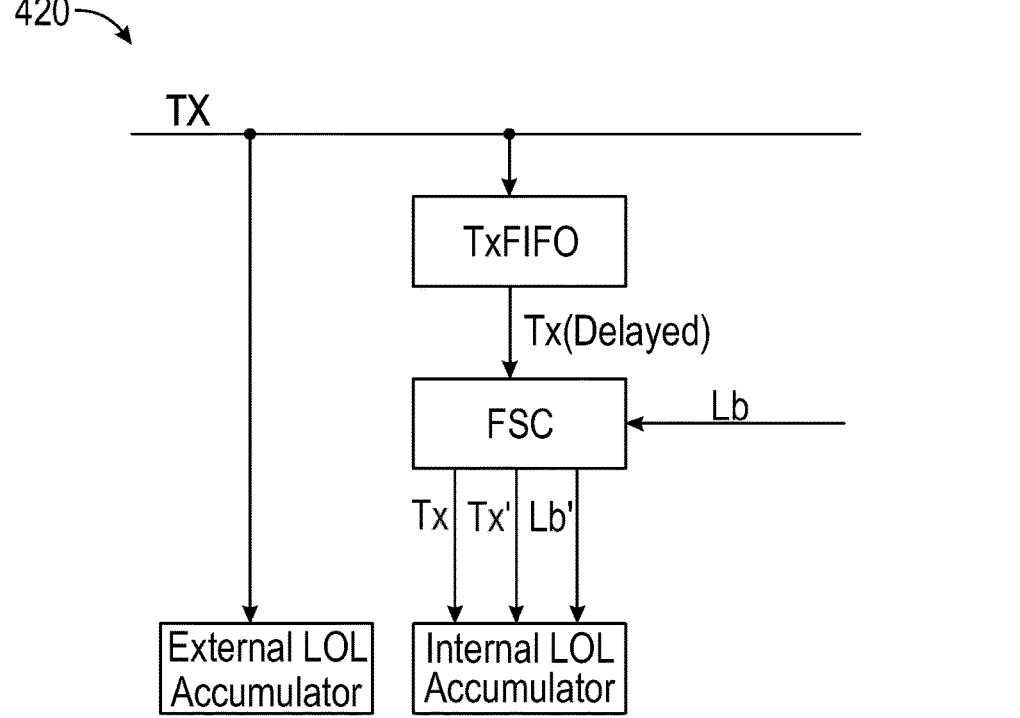
FIG. 6B is a schematic diagram of one embodiment of data flow of the transmit signal samples and the observation receiver samples for the digital transmitter circuitry of FIG. 6A.

FIG. 6A is a schematic diagram of one embodiment of digital transmitter circuitry 410 for processing transmit signal samples (TX) and observation receiver samples (LPBCK). FIG. 6B is a schematic diagram of one embodiment of data flow 420 of the transmit signal samples and the observation receiver samples for the digital transmitter circuitry 410 of FIG. 6A.

The digital transmitter circuitry 410 receives digital samples of the RF transmit signal TX which indicate differential LO leakage signal. The digital transmitter circuitry 410 also receives digital samples of the observation signal LPBCK received via loopback from the observation receiver.

In the illustrated embodiment, the digital transmitter circuitry 410 includes frequency selection circuitry (FSC) 401 for observing the samples at different frequencies. The FSC 401 shifts the TX and LPBCK samples to generate TX samples without shift, TX samples shifted by $2*(f_s-LO)$, and LPBCK samples shifted by LO (to thereby downshift LO content to DC). The shifts can achieved in any suitable way, for instance, using digital mixers 403 and 404 controlled by NCOs 405 and 406. In certain implementations the FSC 401 includes digital accumulators 407 for accumulating each of the three shifted samples.

For internal LO leakage observations, the TX/LPBCK signals can come from the FSC 401. However, for the external LO leakage observations, it is desirable for the TX signal to not be routed through the FSC 401, but instead can get routed independently to a separate LOL accumulator.

The external LOL observation depends on the transmitter to observation receiver mapping, which can be controlled by a user. Because the internal (quadrature error correction (QEC) and LO leakage) observations do not depend on the transmitter to observation receiver mapping, there are times when internal observations are possible even when external observations are not. If the external observations depended on the FSC, then external observations might block internal observations until the transmitter to observation receiver mapping changes.

To avoid external LO leakage observations from blocking internal QEC observations, the TX accumulator for external LOL observations can look directly at the TX signal (not through the FSC), so that TX QEC can simultaneously access the FSC.

In certain implementations, a separate I/Q accumulator is built in the digital transmit path, unconnected and independent from the FSC 401. A similar I/Q accumulator can be built in the observation path for each of the transmitter channels. The I/Q accumulator can perform the accumulations based on the control from the transmitter LO leakage block. Such loopback data can also be shifted in frequency using an NCO so that the LO is at baseband DC, as discussed earlier.

In certain implementations, a batch collection is used for collecting for the TX and LPBCK samples, and only when both have been collected are they allowed to update to the accumulators. To implement this, an active accumulator, a holding register, and a final accumulator can be used for TX samples. With respect to LPBCK samples, an active accumulator and a final accumulator can be used. During data collection, the active accumulator will sum the samples of the TX stream. Once the batch size is reached, active accumulator can be transferred to the holding register and the active accumulator is zeroed to start the next batch of samples. An ORX holding register need not be used because as soon as the active accumulator has completed a batch, the contents can be directly added to the final accumulator.

One embodiment of a model for a Kalman filter for processing transmitter leakage observation data is now described.

The transmitter (Tx) LO leakage (for instance, differential LO leakage) is observed through the internal loopback path. Equation 2 is provided below, where $y_{int}[n]$ is the internal loopback output after rotating the Tx LO frequency to DC, $x_0[n]$ is the user Tx signal near DC, $x_1[n]$ is the interfering user Tx signal that aliases onto the Tx LO at the loopback output, $g_0$ is the complex channel from Tx to loopback at the LO frequency (DC), $g_1$ is the complex channel from Tx to loopback at the interferer frequency, $\mu_c$ is the current Tx LO leakage correction value, $\mu_{int}$ is the Tx LO leakage observable at the loopback output but referred back to the Tx input, and u[n] is uncorrelated zero-mean white noise from either the Tx, loopback, or both.

$$y_{int}[n]=g_0(x_0[n]+\mu_c+\mu_{int})+g_1x_1[n]+u[n] \qquad \text{Equation 2}$$

The Tx LO leakage (for instance, common-mode LO leakage) is also observed through the external path that is looped back to the observation receiver (ORx). Equation 3 is provided below, where $y_{ext}[n]$ is the external ORx output after rotating the Tx LO frequency to DC, $x_0[n]$ is the user Tx signal near DC, $h_0$ is the complex channel from Tx to ORx at the LO frequency (DC), $\mu_c$ is the current Tx LO leakage correction value, $\mu_{int}$ is the Tx LO leakage observable at the loopback output but referred back to the Tx input, $\mu_{ext}$ is an additional Tx LO leakage observable at the ORx output referred back to the Tx input, and v[n] is uncorrelated zero-mean white noise from either the Tx, ORx, or both.

$$y_{ext}[n]=h_0(x_0[n]+\mu_c+\mu_{int}+\mu_{ext})+v[n] \qquad \text{Equation 3}$$

In certain implementations, the Kalman filter is implemented to learn $\mu_c$ to cancel the combined $\mu_{int}+\mu_{ext}$ at the Tx/ORx output by making frequent internal observations but less-frequent external observations. The internal leakage $\mu_{int}$ can be assumed to capture the time-varying component of the LO leakage, while $\mu_{ext}$ can be assumed to be a static bias that changes much less frequently with time.

Equation 4 and 5 below define correlation and summation operations.

$$C(a, b) \equiv \frac{1}{N}\sum_{n=0}^{N-1} a[n]b[n] \qquad \text{Equation 4}$$

-continued $$S(a) \equiv \frac{1}{N}\sum_{n=0}^{N-1} a[n]$$     Equation 5

With respect to observed internal LO leakage, when using the FSC, the Tx input can be cross-correlated with the internal loopback output to quickly learn the unknown channel, as set forth in Equations 6 and 7.

$$C(y_{int}, x_0^*) = g_0(C(x_0, x_0^*) + \mu_c S(x_0^*)) + g_0\mu_{int}S(x_0^*) + g_1 C(x_1, x_0^*) + C(u, x_0^*)$$     Equation 6

$$C(y_{int}, x_1^*) = g_0(C(x_0, x_1^*) + \mu_c S(x_1^*)) + g_0\mu_{int}S(x_1^*) + g_1 C(x_1, x_1^*) + C(u, x_1^*)$$     Equation 7

Because the user Tx signal might have a nearly-zero mean, the cross-correlations are not suitable for estimating the unknown leakage $\mu_{int}$ directly. Equation 8 below relates to a computed sum (which is similar to cross-correlating against the known constant reference signal $\mu_c$).

$$S(y_{int}) = g_0(S(x_0) + \mu_c) + g_0\mu_{int} + g_1 S(x_1) + S(u)$$     Equation 8

Accordingly, from the internal path observation, we have 3 complex observation equations with 3 unknowns ($g_0, g_1, \mu_{int}$) and 3 noise contributors ($C(u, x_0^*), C(u, x_1^*), S(u)$). The observation equation is nonlinear in the unknown due to the $g_0\mu_{int}$ term.

With respect to observed external LO leakage, using the external LOL accumulator block, time-synchronous summations of the Tx input and the ORx output can be performed as set forth in Equation 9 below.

$$S(y_{ext}) = h_0(S(x_0) + \mu_c) + h_0\mu_{int} + h_0\mu_{ext} + S(v)$$     Equation 9

For observed external LO leakage, a single complex observation equation is present with 3 unknowns ($h_0, \mu_{int}, \mu_{ext}$) and a noise contributor ($S(v)$). The observation equation is nonlinear in the unknowns due to the $h_0\mu_{int}$ and $h_0\mu_{ext}$ terms.

The observations equations above could be made linear by lumping together the channel and LOL unknowns (for Combining the internal and external observation equations above, a total of 5 unknown state variables are present as set forth in Equation 10.

$$x = [g_0, g_1, \mu_{int}, h_0, \mu_{ext}]^T$$     Equation 10

An identity state transition matrix can be used to allow the process noise to introduce variation-with-time. The prediction step of the Kalman filter can be given by Equations 11 and 12 set forth below.

$$x_{t|t-1} = x_{t-1|t-1}$$     Equation 11

$$P_{t|t-1} = P_{t-1|t-1} + Q$$     Equation 12

The update step of the Kalman filter can include two steps: (i) an estimation of what the observation should be given the current value of the unknowns, using the full nonlinear observation equation; and (ii) performing a linear Kalman filter update by defining the Jacobian as the observation matrix.

With respect to the first step, Equations 13, 14, 15, 16, and 17 below can be used to estimate what the observations should be given the current estimate of the unknowns.

$$y = [C(y_{int}, x_0^*), C(y_{int}, x_1^*), S(y_{int}), S(y_{ext})]^T$$     Equation 13

$$C(y_{int}, x_0^*) = g_0(C(x_0, x_0^*) + \mu_c S(x_0^*)) + g_0\mu_{int}S(x_0^*) + g_1 C(x_1, x_0^*)$$     Equation 14

$$C(y_{int}, x_1^*) = g_0(C(x_0, x_1^*) + \mu_c S(x_1^*)) + g_0\mu_{int}S(x_1^*) + g_1 C(x_1, x_1^*)$$     Equation 15

$$S(y_{int}) = g_0(S(x_0) + \mu_c) + g_0\mu_{int} + g_1 S(x_1)$$     Equation 16

$$S(y_{ext}) = h_0(S(x_0) + \mu_c) + h_0\mu_{int} + h_0\mu_{ext}$$     Equation 17

With respect to the second step, a linear Kalman filter update can be performed using the Jacobian of the observation system as the observation matrix, as set forth in Equation 18 below.

$$H \equiv$$     Equation 18

$$\begin{bmatrix} \frac{\partial C(y_{int}, x_0^*)}{\partial g_0} & \frac{\partial C(y_{int}, x_0^*)}{\partial g_1} & \frac{\partial C(y_{int}, x_0^*)}{\partial \mu_{int}} & \frac{\partial C(y_{int}, x_0^*)}{\partial h_0} & \frac{\partial C(y_{int}, x_0^*)}{\partial \mu_{ext}} \\ \frac{\partial C(y_{int}, x_1^*)}{\partial g_0} & \frac{\partial C(y_{int}, x_1^*)}{\partial g_1} & \frac{\partial C(y_{int}, x_1^*)}{\partial \mu_{int}} & \frac{\partial C(y_{int}, x_1^*)}{\partial h_0} & \frac{\partial C(y_{int}, x_1^*)}{\partial \mu_{ext}} \\ \frac{\partial S(y_{int})}{\partial g_0} & \frac{\partial S(y_{int})}{\partial g_1} & \frac{\partial S(y_{int})}{\partial \mu_{int}} & \frac{\partial S(y_{int})}{\partial h_0} & \frac{\partial S(y_{int})}{\partial \mu_{ext}} \\ \frac{\partial S(y_{ext})}{\partial g_0} & \frac{\partial S(y_{ext})}{\partial g_1} & \frac{\partial S(y_{ext})}{\partial \mu_{int}} & \frac{\partial S(y_{ext})}{\partial h_0} & \frac{\partial S(y_{ext})}{\partial \mu_{ext}} \end{bmatrix} =$$

$$\begin{bmatrix} C(x_0, x_0^*) + \mu_c S(x_0^*) + \mu_{int}S(x_0^*) & C(x_1, x_0^*) & g_0 S(x_0^*) & 0 & 0 \\ C(x_0, x_1^*) + \mu_c S(x_1^*) + \mu_{int}S(x_1^*) & C(x_1, x_1^*) & g_0 S(x_1^*) & 0 & 0 \\ S(x_0) + \mu_c + \mu_{int} & S(x_1) & g_0 & 0 & 0 \\ 0 & 0 & h_0 & S(x_0) + \mu_c + \mu_{int} + \mu_{ext} & h_0 \end{bmatrix}$$

example, estimating the LOL at the loopback/ORx output, instead of referring to the Tx input), but the nonlinear form allows the internal and external unknowns to be joined through $\mu_{int}$, which is referred to the same common Tx input. Because the observation equations are nonlinear, a nonlinear estimation algorithm (for example, a Kalman filter) can be used.

For the case when certain observations are missing, corresponding columns from the Jacobian can be removed, and a Kalman update performed with reduced observation dimensions. For example, if the external observation data is not available at the current time step, then the observation dimensionality is reduced from 4 to 3.

Example Transmitters Implemented with Multiple Local Loopbacks

Figure 7:
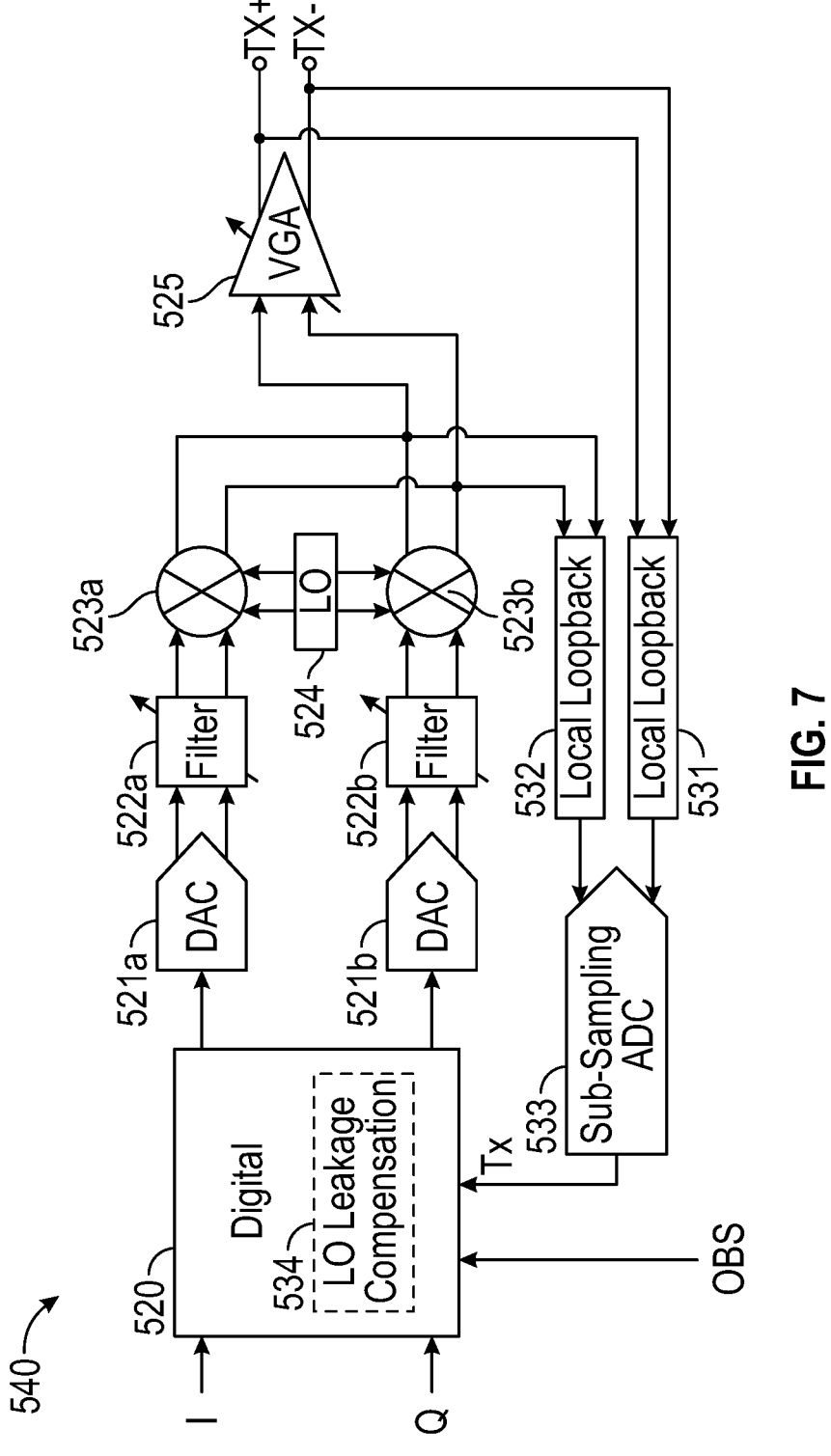
FIG. 7 is a schematic diagram of a transmitter according to another embodiment.

FIG. 7 is a schematic diagram of a transmitter 540 according to another embodiment. The transmitter 540 includes digital transmitter circuitry 520, an I-path DAC 521a, an I-path controllable filter 522a, an I-path mixer 523a, a Q-path DAC 521b, a Q-path controllable filter 522b, a Q-path mixer 523b, a variable gain amplifier (VGA) 525, a first local loopback circuit 531, a second local loopback circuit 532, and a subsampling ADC 533.

As shown in FIG. 7, the digital transmitter circuitry 520 receives I transmit data and Q transmit data, which are provided to the I-path DAC 521a and the Q-path DAC 521b, respectively, after digital processing.

The I-path DAC 521a serves to convert the I transmit data into an analog I signal, which is filtered by the I-path controllable filter 522a to generate a filtered I signal. The filtered I signal is upconverted by the I-path mixer 523a to radio frequency. In particular, the I-path mixer 523a mixes the filtered I signal and a first LO clock signal from the LO 524 to generate an upconverted I signal.

Likewise the Q-path DAC 521b serves to process the Q transmit data to generate an analog Q signal, which is filtered by the Q-path controllable filter 522b to generate a filtered Q signal. Additionally, the Q-path mixer 523b mixes the filtered Q signal and a second LO clock signal from the LO 524 to generate an upconverted Q signal.

The LO 524 can be implemented in a wide variety of ways, including, but not limited to, using a frequency synthesizer, such as a fractional N PLL. The first LO clock signal and the second LO clock signal can have a phase difference suitable for upconverting the filtered I signal and the filtered Q signal. For example, a quadrature phase difference can be used.

The upconverted I signal and the upconverted Q signal are combined to generate a differential transmit signal, which is amplified by the VGA 525 to generate an amplified differential transmit signal provided between pins TX+ and TX−. The amplified differential transmit signal is provided to an RF front end system (for example, the RF front end system 2 of FIG. 1).

As shown in FIG. 7, the digital transmitter circuitry 520 further includes an LO leakage compensation circuit 534 for adjusting the I transmit signal and the Q transmit signal to compensate for LO leakage arising from the LO 524. Such LO leakage can include differential LO leakage and common-mode LO leakage.

The LO leakage compensation is based on transmit samples TX of the RF transmit signal generated by the transmitter 540 as well as observation samples OBS captured from an observation receiver (see, for example, the observation receiver 6 of FIG. 1) using an external loopback path through an RF front end system.

In the illustrated embodiment, the transmitter 540 operates with multiple (two, in this example) local loopback paths in addition to an external loopback path through the observation receiver. In particular, a first local loopback circuit 531 is included for observing the RF transmit signal after amplification by the VGA 525, and a second local loopback circuit 532 is included for observing the RF transmit signal prior to amplification by the VGA 525.

Including multiple local loopback paths provides a number of advantages. For example, the first local loopback path 531 includes effects of the VGA 525 as well as any of noise coupled through the RF transmit signal output pins. However, when the VGA 525 is operated with low gain setting, the amplified RF transmit signal can have low signal-tonoise ratio (SNR), which leads to delay due to a large number of samples being taken for averaging. Moreover, any calibration for LO leakage using the first local loopback path 531 also exposes downstream circuitry (for instance, a power amplifier) to the RF transmit signal generated by the transmitter 540.

In contrast, the second local loopback path 532 can be used even when the VGA 525 is turned off to prevent the RF transmit signal from propagating to (and potentially damaging) downstream circuitry. Furthermore, the second local loopback path 532 is shielded from effects of output impedance matching, and exhibits good SNR even when the VGA 525 gain setting is low. However, the second local loopback path 532 can miss effects of LO leakage occurring after the VGA 525.

With continuing reference to FIG. 7, the RF transmit signal can have relatively high frequency, for instance, up to about 7.125 GHz for cellular communications using frequency range 1 (FR1) of fifth generation (5G) technology. The subsampling ADC 533 operates with a sampling rate that is less than the carrier frequency of the RF transmit signal, in this embodiment. Using a sub-sampling ADC provides a number of advantages, such as reduced area, power consumption, and/or cost.

To aid in preventing aliasing effects (for instance, image issues) from hindering operation of LO leakage correction, the I-path mixer 523a and the Q-path mixer 523b can be implemented as harmonic rejection mixers. In certain implementations, the I-path mixer 523a and the Q-path mixer 523b are at least third-order harmonic rejection mixers, or more preferably, third-order and fifth-order harmonic rejection mixers.

By implementing the mixers in this manner, issues arising from aliasing third and fifth order harmonic components are alleviated.

In certain implementations, higher-order harmonics, for instance, seventh-order harmonics, are accounted for using RF filters included in the first local loopback circuit 531 and the second local loopback circuit 532. Thus, the combination of harmonic-rejection mixers and RF filters can serve to reduce issues arising from aliasing.

To further account for aliasing the LO leakage compensation circuit can be implemented to model and predict the effects of aliasing. For example, an FSC (see for example, FIGS. 6A and 6B) can be included in digital transmitter circuitry to aid in achieving such functionality. Thus, digital processing can serve as another layer of compensation for aliasing.

Figure 8:
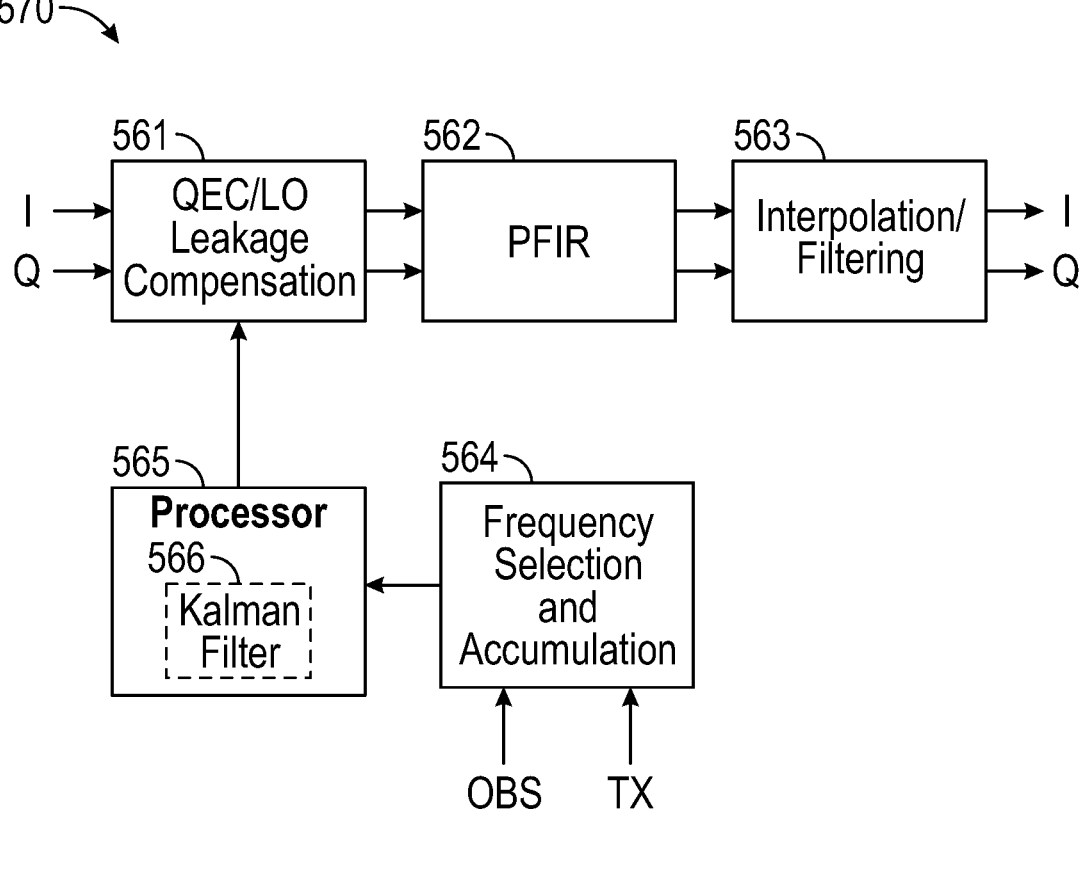
FIG. 8 is a schematic diagram of one embodiment of digital transmitter circuitry.

FIG. 8 is a schematic diagram of one embodiment of digital transmitter circuitry 570. The digital transmitter circuitry 570 can be used, for example, in the digital transmitter circuitry 520 of FIG. 7. As shown in FIG. 8, the digital transmitter circuitry 570 includes a QEC/LO leakage compensation circuit 561, a programmable finite impulse response filter (PFIR) 562, an interpolation/filtering circuit 563, a frequency selection and accumulation circuit 564, and a processor 565 including software stored in memory and operable to implement a Kalman filter 566.

The digital transmitter circuitry 570 processes digital I and Q transmit signals, and provides the processed digital I and Q transmit signals to a pair of DACs (not shown in FIG. 8). The digital I and Q transmit signals are received from a baseband processor (not shown in FIG. 8).

In the illustrated embodiment, the frequency selection and accumulation circuit 564 receives transmit samples TX of the RF transmit signal locally obtained (through one or more on-chip local loopback paths) as well as observation samples OBS captured from an observation receiver through one or more external loopback paths (through an RF front end). The frequency selection and accumulation circuit 564 can shift the frequency of the samples (for instance, using a digital mixer and NCO) and accumulate the frequency shifted samples, for instance, as described earlier with respect to FIGS. 6A and 6B.

The processor 565 receives the accumulated samples, and the Kalman filter 566 operates to process the accumulated samples to control at least settings for LO leakage compensation in the QEC/LO leakage compensation circuit 561. Although shown as controlling only the QEC/LO leakage compensation circuit 561 (for instance, DC offsets added to each of the digital I and Q transmit signals), the Kalman filter 566 can control other circuitry.

For example, the Kalman filter 566 can control the PFIR 562 to provide equalization to controllable filters in the I and Q paths (for instance, the I-path controllable filter 522a and the Q-path controllable filter 522b of FIG. 7) and/or settings of the controllable filters themselves, such as inductor and/or capacitor values used for filtering. Additionally or alternatively, the Kalman filter 566 can control frequency, amplitude, and/or phase settings used for calibrating the transmitter for LO leakage. For instance, in certain instances, a calibration cycle is run using test tones, which can be injected when no transmit signal is present or added to the transmit signal when present. Thus, the Kalman filter 566 can providing dithering or other perturbations to aid in calibration.

Although one example of digital transmitter circuity is depicted, other implementations are possible.

Figure 9:
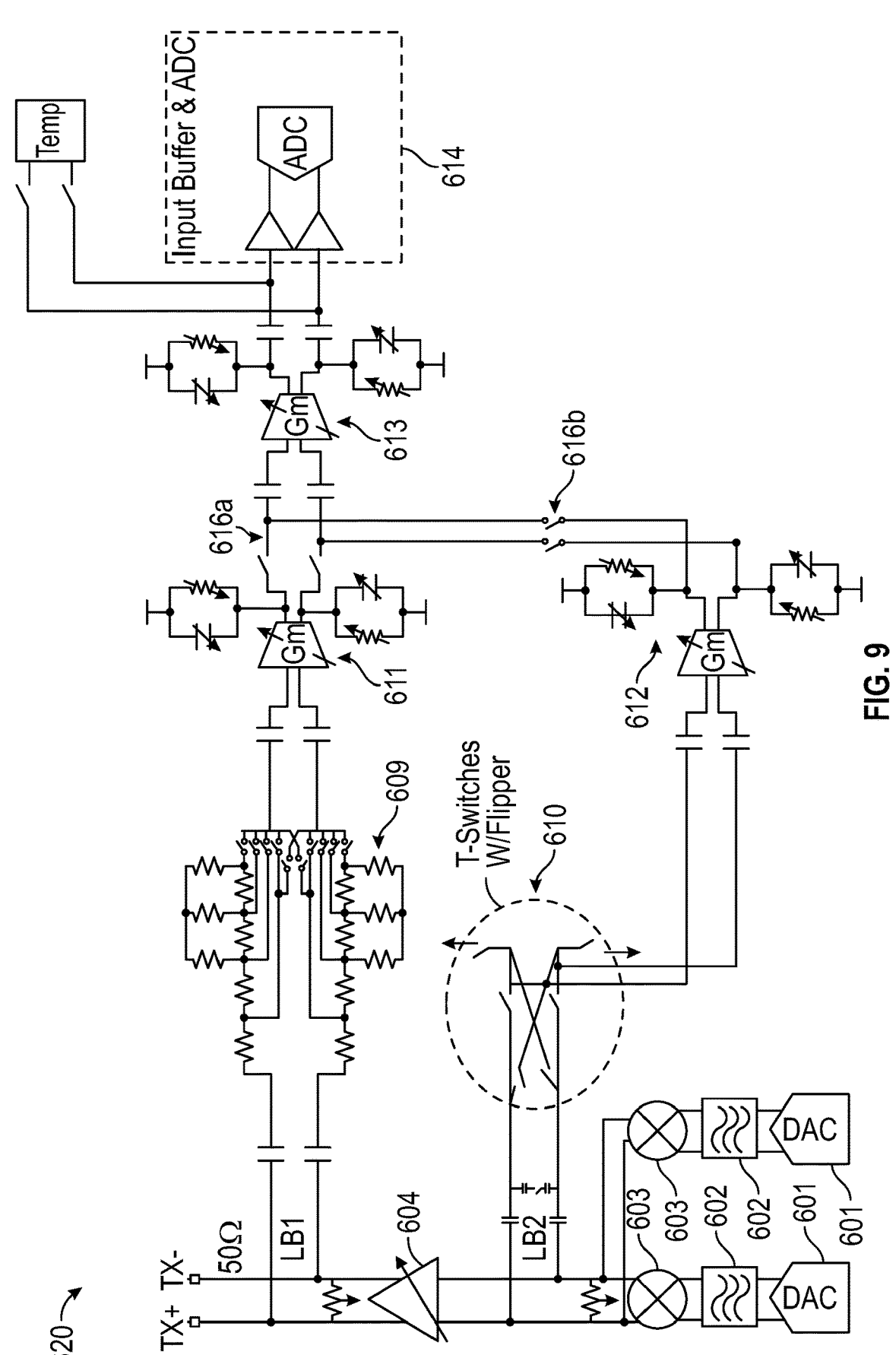
FIG. 9 is a schematic diagram of a transmitter according to another embodiment.

FIG. 9 is a schematic diagram of a transmitter 620 according to another embodiment. The transmitter 620 includes various components including a pair of DACs 601, a pair of controllable filters 602, a pair of mixers 603, a VGA 604, a first local loopback path LB1, a second local loopback path LB2, and a subsampling ADC 614.

As shown in FIG. 9, the first loopback path LB1 is after the VGA 604 and includes a controllable attenuator 609, a first gain control and harmonic filtering circuit 611. Additionally, the second loopback path LB2 is before the VGA 604 and includes input switches 610 (with ability to flip polarity of the differential RF transmit signal) and a second gain control and harmonic filtering circuit 612.

With continuing reference to FIG. 9, the first loopback path LB1 is coupled to a third gain control and harmonic filtering circuit 613 by way of a first pair of switches 616a, while the second loopback path LB2 is coupled to the third gain control and harmonic filtering circuit 613. The output of the third gain control and harmonic filtering circuit 613 is provided to the subsampling ADC 614. The subsampling ADC 614 outputs samples of the RF transmit signal and/or amplified RF transmit signal.

To aid in preventing aliasing effects from hindering operation of LO leakage correction, the pair of mixers 603 can be implemented as harmonic rejection mixers, for instance, mixers that reject third and fifth order harmonics. By implementing the mixers in this manner, issues arising from aliasing third and fifth order harmonic components is alleviated. Such aliasing can arise due to the subsampling ADC 614 having a sampling rate less than the carrier frequency of the RF transmit signal.

In certain implementations, higher-order harmonics, for instance, seventh-order harmonics, are accounted for using the depicted RF filters of the gain control and harmonic filtering circuits 611-613. Thus, the combination of harmonic-rejection mixers and RF harmonic filters can serve to reduce issues arising from aliasing.

To further account for aliasing, digital transmitter circuitry that processes the transmit samples from the subsampling ADC can be implemented to model and predict the effects of aliasing. For example, an FSC (see for example, FIGS. 6A and 6B) can be included in the digital transmitter circuitry to aid in achieving such functionality. Thus, digital processing can serve as another layer of compensation for aliasing.

Figure 10A:
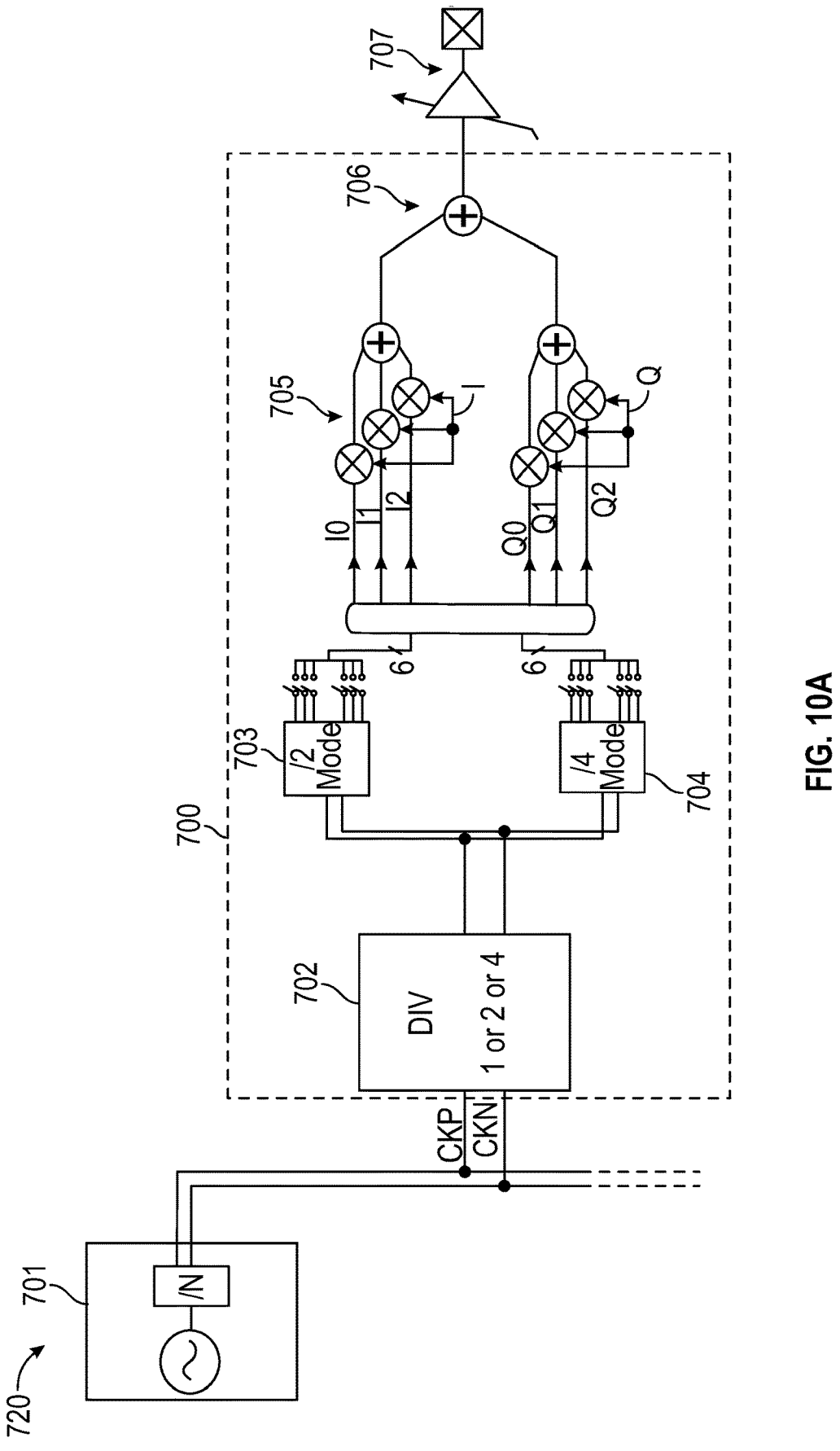
FIG. 10A is a schematic diagram of circuitry including a controllable oscillator, a variable gain amplifier, and harmonic rejection mixers according to one embodiment.
Figure 10B:
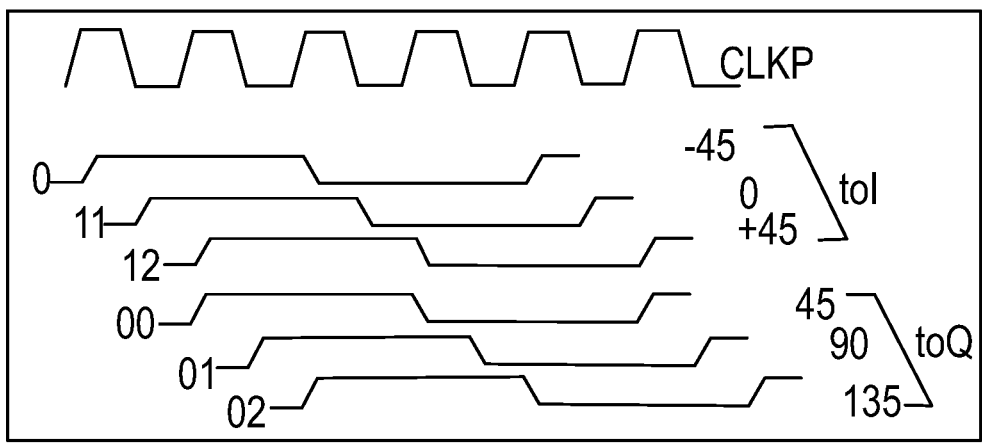
FIG. 10B is a graph of the circuitry of FIG. 10A operating in a divide by two mode.
Figure 10C:
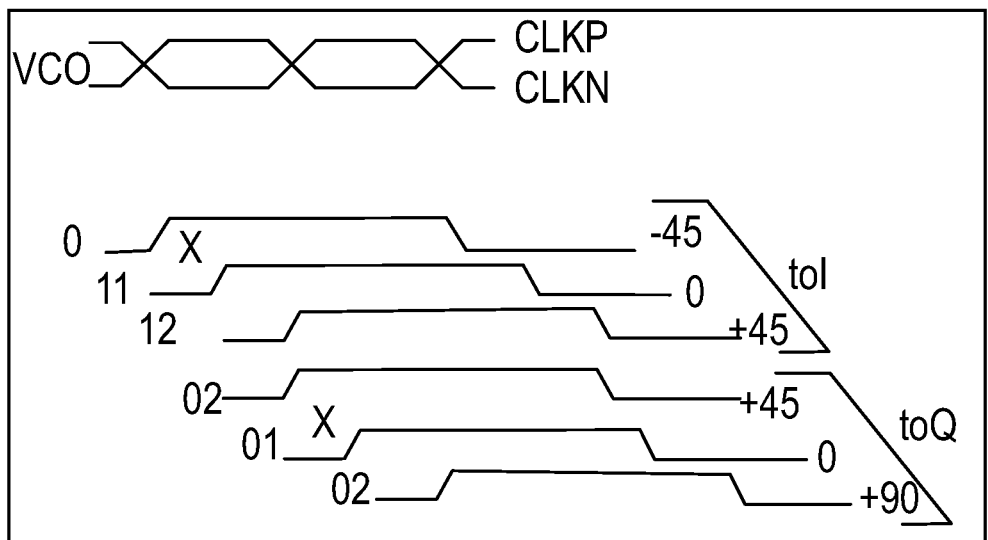
FIG. 10C is a graph of the circuitry of FIG. 10A operating in a divide by four mode.

FIG. 10A is a schematic diagram of circuitry 720 including a controllable oscillator 701, a VGA 707, and harmonic rejection mixers 700 according to one embodiment. FIG. 10B is a graph of the circuitry 720 of FIG. 10A operating in a divide by two mode. FIG. 10C is a graph of the circuitry 720 of FIG. 10A operating in a divide by four mode.

As shown in FIG. 10A, the controllable oscillator 701 (which be, for example, a fractional-N PLL) outputs a pair of clock signals CKP and CKN. The circuitry 720 further includes a controllable divider 702, which can divide the pair of clock signals CLKP and CKN with a controllable division rate, for instance, 1, 2 or 4.

The control circuitry 720 further includes divide by 2 mode circuitry 703 and divide by 4 circuitry 704 for processing the output of the controllable divider 702 to generate multiple LO clock signal phases that are mixed by the mixers 705 with I and Q signals. Six LO clock signal phases (I0, I1, I2, Q0, Q1, Q2) are used in this example for purposes of harmonic rejection of the third and fifth order harmonics. The outputs of the mixers 705 are combined by the combiners 706 to generate an RF transmit signal provided to the VGA 707.

By using multiple mixers 705 that are combined in this manner, third and fifth order harmonic rejection is provided.

When the controllable oscillator 701 is operating at relatively lower frequency (for instance, 3.5 GHz or less), the divide by 4 circuitry 704 can be used to generate multiple clock signal phases, as shown in FIG. 10B.

However, when the desired LO frequency is relatively high (for instance, greater than 3.5 GHz), it may be infeasible to operate the controllable oscillator 701 at four times this LO frequency and use the divide by 4 circuitry 704. Thus, the divide by 2 circuitry 703 is included, which provides division by 2 and uses interpolation to generate the other LO clock signal phases desired for providing harmonic rejection of third and fifth order harmonics. Example results of the divide by 2 mode are shown in FIG. 10C.

Conclusion

The transceivers herein can handle signals of a variety of frequencies, including not only RF signals between 100 MHz and 7 GHz, but also signals of higher frequencies, such as those in the X band (about 7 GHz to 12 GHz), the $K_u$ band (about 12 GHz to 18 GHz), the K band (about 18 GHz to 27 GHz), the $K_a$ band (about 27 GHz to 40 GHz), the V band (about 40 GHz to 75 GHz), and/or the W band (about 75 GHz to 110 GHz). Accordingly, the teachings herein are applicable to a wide variety of RF communication systems, including microwave systems.

The foregoing description may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits is not adversely affected).

While certain embodiments have been described, these embodiments have been presented by way of example only, and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while the disclosed embodiments are presented in a given arrangement, alternative embodiments may perform similar functionalities with different components and/or circuit topologies, and some elements may be deleted, moved, added, subdivided, combined, and/or modified. Each of these elements may be implemented in a variety of different ways. Any suitable combination of the elements and acts of the various embodiments described above can be combined to provide further embodiments. Accordingly, the scope of the present invention is defined only by reference to the appended claims.

It is to be understood that any claim may depend on any preceding claim of the same type except when that is clearly not technically feasible.

What is claimed is:

1. A transceiver integrated circuit (IC) comprising:
a first transmitter including at least one mixer and a local oscillator (LO), wherein the first transmitter is configured to generate a first radio frequency (RF) transmit signal based on the LO controlling the at least one mixer to provide frequency upconversion; and
an observation receiver configured to receive an observation signal for observing at least the first transmitter, wherein the observation receiver includes an observation data path configured to process the observation signal to detect a transmit power of the first RF transmit signal, and an LO leakage observation circuit configured to generate leakage observation data based on processing data captured from the observation data path, the LO leakage observation circuit including a digital mixer configured to generate frequency-shifted data based on mixing the data captured from the observation data path, and a digital accumulator configured to generate the leakage observation data based on accumulating the frequency-shifted data,
wherein the first transmitter is configured to process the leakage observation data to compensate for a leakage of the LO.

2. The transceiver IC of claim 1, wherein the LO leakage observation circuit does not interrupt the observation data path from detecting the transmit power.

3. The transceiver IC of claim 1, wherein the observation data path is further configured to process the observation signal to perform digital pre-distortion (DPD), wherein the LO leakage observation circuit does not interrupt the observation data path from performing DPD.

4. The transceiver IC of claim 1, wherein the first transmitter is further configured to compensate for the leakage of the LO based on local transmit observation data from one or more local observation paths of the transceiver IC.

5. The transceiver IC of claim 4, wherein the first transmitter is configured to detect a differential LO leakage from the local leakage observation data, and a common-mode LO leakage from the leakage observation data from the observation receiver.

6. The transceiver IC of claim 4, wherein the first transmitter further includes a variable gain amplifier (VGA) configured to amplify the first RF transmit signal, wherein the one or more local observation paths includes a first local observation path after the VGA and a second local observation path before the VGA.

7. The transceiver IC of claim 4, wherein the first transmitter comprises a digital filter configured to process both the local leakage observation data and the leakage observation data from the observation receiver.

8. The transceiver IC of claim 7, wherein the digital filter is a Kalman filter.

9. The transceiver IC of claim 4, wherein the first transmitter is configured to collect the local leakage observation data and the leakage observation data from the observation receiver in a plurality of batches.

10. The transceiver IC of claim 9, wherein the first transmitter is configured to update a value of an LO leakage compensation signal for compensating for the leakage of the LO after receiving a given number of samples of the local leakage observation data and the leakage observation data from the observation receiver.

11. The transceiver IC of claim 1, wherein the LO leakage observation circuit further includes a digital oscillator configured to provide a digital clock signal to the digital mixer.

12. The transceiver IC of claim 1, further comprising a plurality of transmitters including the first transmitter, wherein the observation signal is configured to observe one of the plurality of transmitters at a given time, and wherein the LO leakage observation circuit is configured to separately track the leakage observation data for each of the plurality of transmitters.

13. The transceiver IC of claim 1, wherein the observation data path includes an analog-to-digital converter (ADC) configured to generate a digital observation signal based on the observation signal, and a digital circuit configured to process the digital observation signal.

14. A transceiver integrated circuit (IC) comprising:
a plurality of transmitters including a first transmitter that includes at least one mixer and a local oscillator (LO), wherein the first transmitter is configured to generate a first radio frequency (RF) transmit signal based on the LO controlling the at least one mixer to provide frequency upconversion; and
an observation receiver configured to receive an observation signal for observing at least the first transmitter, wherein the observation receiver includes an observation data path configured to process the observation signal to detect a transmit power of the first RF transmit signal, and an LO leakage observation circuit configured to generate leakage observation data based on processing data captured from the observation data path, wherein the observation signal is configured to observe one of the plurality of transmitters at a given time, wherein the LO leakage observation circuit is configured to separately track the leakage observation data for each of the plurality of transmitters, and
wherein a selected transmitter for observation of the plurality of transmitters is changeable without interrupting operation of the LO leakage observation circuit.

15. The transceiver IC of claim 14, wherein the observation data path is further configured to process the observation signal to perform digital pre-distortion (DPD), wherein the LO leakage observation circuit does not interrupt the observation data path from performing DPD.

16. The transceiver IC of claim 14, wherein the first transmitter is further configured to compensate for the leakage of the LO based on local transmit observation data from one or more local observation paths of the transceiver IC.

17. The transceiver IC of claim 14, wherein the observation data path includes an analog-to-digital converter (ADC) configured to generate a digital observation signal based on the observation signal, and a digital circuit configured to process the digital observation signal.

18. A method of compensating for local oscillator (LO) leakage in a transceiver, the method comprising:

generating a first radio frequency (RF) transmit signal using a first transmitter that includes at least one mixer and a local oscillator (LO) that controls the at least one mixer;

generating an observation signal based on a loopback path from the first transmitter to an observation receiver through an RF front end;

processing the observation signal to detect a transmit power of the first RF transmit signal using an observation data path of the observation receiver;

generating leakage observation data based on processing data captured from the observation data path;

processing the leakage observation data to compensate for a leakage of the LO;

compensating for the leakage of the LO based on local transmit observation data from one or more local observation paths that are not through the RF front end; and merging the local leakage observation data and the leakage observation data from the observation receiver using a digital filter.

19. The method of claim 18, wherein the leakage observation data is generated without interrupting detection of the transmit power.

20. The method of claim 18, wherein processing the observation signal includes performing digital pre-distortion (DPD) on the first RF transmit signal, wherein the leakage observation data is generated without interrupting DPD.

\* \* \* \* \*